(12) United States Patent
Kim

(10) Patent No.: US 11,482,212 B2
(45) Date of Patent: Oct. 25, 2022

(54) ELECTRONIC DEVICE FOR ANALYZING MEANING OF SPEECH, AND OPERATION METHOD THEREFOR

(71) Applicant: Samsung Electronics Co., Ltd., Suwon-si (KR)

(72) Inventor: Jun Seong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 16/954,019

(22) PCT Filed: Nov. 7, 2018

(86) PCT No.: PCT/KR2018/013416
§ 371 (c)(1),
(2) Date: Jun. 15, 2020

(87) PCT Pub. No.: WO2019/117466
PCT Pub. Date: Jun. 20, 2019

(65) Prior Publication Data
US 2021/0082406 A1  Mar. 18, 2021

(30) Foreign Application Priority Data
Dec. 14, 2017 (KR) .......................... 10-2017-0172637

(51) Int. Cl.
*G10L 15/16* (2006.01)
*G06N 3/04* (2006.01)
(Continued)

(52) U.S. Cl.
CPC .............. *G10L 15/16* (2013.01); *G06F 40/30* (2020.01); *G06N 3/04* (2013.01); *G06N 3/08* (2013.01);
(Continued)

(58) Field of Classification Search
CPC ... G06N 3/08; G06N 3/04; G06N 3/02; G06F 40/30; G10L 15/16
See application file for complete search history.

(56) References Cited

U.S. PATENT DOCUMENTS 9,263,036 B1   2/2016 Graves
9,959,272 B1 * 5/2018 Čanĕk ................. G06N 3/0445
(Continued)

FOREIGN PATENT DOCUMENTS

KR   10-2017-0050029 A   5/2017
KR   10-2017-0095582 A   8/2017

OTHER PUBLICATIONS

Liu et al., "Attention-Based Recurrent Neural Network Models for Joint Intent Detection and Slot Filling", Sep. 6, 2016.
(Continued)

*Primary Examiner* — Samuel G Neway
(74) *Attorney, Agent, or Firm* — Jefferson IP Law, LLP

(57) ABSTRACT

An electronic device using an artificial neural network model including an attention mechanism, according to various embodiments, can comprise: a memory configured to store information including a plurality of recurrent neural network (RNN) layers; and at least one processor connected with the memory and configured to set, as a first key and a value, at least one first hidden representation acquired through at least one layer among the plurality of RNN layers, set, as a second key, at least one second hidden representation acquired through at least one second layer among the plurality of RNN layers, and acquire an attention included in an attention structure at least on the basis of data on the first key, data on the second key, or data on the value.

15 Claims, 8 Drawing Sheets

(51) Int. Cl.
  *G06N 3/08*   (2006.01)
  *G10L 15/06*   (2013.01)
  *G10L 15/18*   (2013.01)
  *G10L 15/183*   (2013.01)
  *G10L 19/00*   (2013.01)
  *G06F 40/30*   (2020.01)

(52) U.S. Cl.
  CPC .......... *G10L 15/063* (2013.01); *G10L 15/183* (2013.01); *G10L 15/1815* (2013.01); *G10L 19/00* (2013.01)

(56) References Cited

U.S. PATENT DOCUMENTS

| | | | |
|---|---|---|---|
| 2015/0310862 | A1 | 10/2015 | Dauphin et al. |
| 2015/0364128 | A1 | 12/2015 | Zhao et al. |
| 2016/0314392 | A1 | 10/2016 | Honkala et al. |
| 2016/0350653 | A1* | 12/2016 | Socher ..................... G06N 5/04 |
| 2017/0125020 | A1 | 5/2017 | Seo et al. |
| 2017/0148431 | A1 | 5/2017 | Catanzaro et al. |
| 2017/0262996 | A1* | 9/2017 | Jain ...................... G06K 9/4671 |
| 2017/0278510 | A1 | 9/2017 | Zhao et al. |
| 2017/0293804 | A1 | 10/2017 | Min et al. |
| 2017/0323203 | A1 | 11/2017 | Matusov et al. |
| 2017/0323636 | A1 | 11/2017 | Xiao et al. |
| 2019/0156220 | A1* | 5/2019 | Zhu ...................... G06N 3/0427 |
| 2021/0082406 | A1* | 3/2021 | Kim ..................... G06N 3/0445 |

OTHER PUBLICATIONS

Zhang et al., "A Joint Model of Intent Determination and Slot Filling for Spoken Language Understanding", Jul. 2016.
Zhang et al., "Position-aware Attention and Supervised Data Improve Slot Filling", California, Jul. 2017.
Liu et al., "Joint Online Spoken Language Understanding and Language Modeling with Recurrent Neural Networks", Sep. 6, 2016.
Mesnil et al., "Using Recurrent Neural Networks for Slot Filling in Spoken Language Understanding", Mar. 3, 2015.
European Search Report dated Dec. 9, 2020, issued in European Application No. 18889592.4.
"Neural Machine Translation By Jointly Learning To Align and Translate", May 19, 2016, Jacobs University Bremen, Germany.
"Attention-Based Recurrent Neural Network Models for Joint Intent Detection and Slot Filling", INTERSPEECH; Sep. 16, 2016, San Francisco, USA.
"Long-term Aware Attention of RNN for joint semantic parsing", NAACL-HLT 2018 Submission.
"Leveraging Sentence-level Information with Encoder LSTM for Natural Language Understanding", Jan. 7, 2016.
"Using Recurrent Neural Networks for Slot Filling in Spoken Language Understanding", IEEE/ACM Transactions on Audio, Speech, and Language Processing, vol. 23, No. 3, Mar. 2015.
"Attention Is All You Need", 31st Conference on Neural Information Processing Systems (NIPS 2017), Long Beach, CA, USA.
"A Convolutional Encoder Model for Neural Machine Translation", Jul. 25, 2017.
"Empirical Evaluation of Gated Recurrent Neural Networks on Sequence Modeling", Dec. 11, 2014.
"Recurrent Models of Visual Attention".
"Multi-Way, Multilingual Neural Machine Translation with a Shared Attention Mechanism", Proceedings of NAACL-HLT 2016, pp. 866-875, Jun. 17, 2016, San Diego, California.
"When and why are log-linear models self-normalizing?", Jacob Andreas and Dan Klein Computer Science Division University of California, Berkeley.
Towards Zero-Shot Frame Semantic Parsing for Domain Scaling, Jul. 7, 2017.
"Recurrent Neural Networks with External Memory for Spoken Language Understanding", May 31, 2015.
"Recurrent Neural Network Structured Output Prediction for Spoken Language Understanding", Bing Liu, Ian Lane Department of Electrical and Computer Engineering Carnegie Mellon University.
"The ATIS Spoken Language Systems Pilot Corpus", 1990, Dallas, Texas.
"Multi-Domain Joint Semantic Frame Parsing using Bi-directional RNN-LSTM", INTERSPEECH, Sep. 12, 2016, San Francisco, USA.
"Recurrent Nets that Time and Count", Jun. 9, 2016.
"On the State of the Art of Evaluation in Neural Language Models", Nov. 20, 2017.
"Named Entity Recognition with Bidirectional LSTM-CNNs", Jul. 19, 2016.
"Convolutional Sequence to Sequence Learning", Jul. 25, 2017.
"Intent Detection Using Semantically Enriched Word Embeddings", 2016 IEEE, The Ohio State University, Columbus, Ohio, USA; Microsoft, Washington, USA.
"Spoken Language Understanding Using Long Short-Term Memory Neural Networks", 2014 IEEE.
"Character-Word LSTM Language Models", Apr. 10, 2017.
"ADADELTA: An Adaptive Learning Rate Method", Dec. 12, 2012.
"Dropout: A Simple Way to Prevent Neural Networks from Overfitting", Journal of Machine Learning Research 15 ;2014.
"Batch Normalization: Accelerating Deep Network Training by Reducing Internal Covariate Shift", Mar. 2, 2015.
"Regularizing and Optimizing LSTM Language Models", Aug. 7, 2017.
"A Comparative Study of Neural Network Models for Lexical Intent Classification"; 2015 IEEE; International Computer Science Institute University of California, Berkeley, CA, USA; Microsoft Research, Mountain View, CA, USA.
"Recurrent Neural Network and LSTM Models for Lexical Utterance Classification", INTERSPEECH 2015.
"Contextual Spoken Language Understanding Using Recurrent Neural Netwoks", 2015 IEEE.
"A Theoretically Grounded Application of Dropout in Recurrent Neural Networks", 30th Conference on Neural Information Processing Systems (NIPS 2016), Barcelona, Spain.
"Character-Aware Neural Language Models", Proceedings of the Thirtieth AAAI Conference on Artificial Intelligence (AAAI-16).
"Bidirectional LSTM-CRF Models for Sequence Tagging", Aug. 9, 2015.

* cited by examiner

ELECTRONIC DEVICE FOR ANALYZING MEANING OF SPEECH, AND OPERATION METHOD THEREFOR

TECHNICAL FIELD

Various embodiments relate to a method and an electronic device for analyzing a meaning of a speech by using an artificial neural network.

BACKGROUND ART

With the development of digital technology, electronic devices (for example, servers) for understanding human language, and applications (for example, a speech recognition application) associated with the electronic devices to be executed in user terminals are developing. An electronic device for understanding human language may obtain a user's intent from a sentence inputted in the form of text data, and may obtain a parameter (for example, a slot) necessary for representing the intent. The electronic device may use an artificial neural network to obtain the user's intent and the parameter necessary for representing the intent. The electronic device may include a memory in which the artificial neural network for understanding human language is implemented.

DISCLOSURE OF INVENTION

Technical Problem

A role or a meaning of a word in a sentence may vary according to how long a focused portion in the sentence is. That is, a role or a meaning of a word in a sentence may vary according to a length of a portion that is considered to interpret the role or meaning of the word in the sentence. However, when a meaning of a speech is analyzed by using an artificial neural network, information close to a current analysis position may be considered as being of great importance, and information distant therefrom may be difficult to consider. Alternatively, when there is a noise or an intermediate meaningless input, it may be difficult to analyze the exact meaning of the speech. Accordingly, there is a demand for a method of considering information distant from a current position in analyzing a meaning of a speech by using an artificial neural network.

Various embodiments provide an electronic device and a method for analyzing a meaning of a speech more exactly by considering information distant from a current position in a spoken sentence.

The technical object to be achieved by the disclosure is not limited to that mentioned above, and other technical objects that are not mentioned above may be clearly understood to those skilled in the art based on the description provided below.

Solution to Problem

According to various embodiments, an electronic device using an artificial neural network model including an attention mechanism may include: a memory configured to store information including plurality of recurrent neural network (RNN) layers; and at least one processor connected with the memory, wherein the at least one processor is configured to: set, as a first key and a value, at least one first hidden representation obtained through at least one first layer from among the plurality of RNN layers; set, as a second key, at least one second hidden representation obtained through at least one second layer from among the plurality of RNN layers; and, based at least on data on the first key, data on the second key, or data on the value, obtain an attention included in the attention mechanism.

According to various embodiments, a non-transitory computer-readable storage medium may store one or more programs for storing information including a plurality of recurrent neural network (RNN) layers, and for executing: setting, as a first key and a value, at least one first hidden representation obtained through at least one first layer from among the plurality of RNN layers; setting, as a second key, at least one second hidden representation obtained through at least one second layer from among the plurality of RNN layers; and, based at least on data on the first key, data on the second key, or data on the value, obtaining an attention included in an attention mechanism.

Advantageous Effects of Invention

When obtaining an attention for analyzing a meaning of a speech, the device and the method according to various embodiments may use, as a key, a hidden representation obtained through a plurality of layers included in an artificial neural network of an encoder, and may use, as a key and a value, a hidden representation obtained through at least one layer of the plurality of layers, such that information distant from a current position is considered and the meaning of the speech can be more exactly analyzed.

The effects that can be achieved by the disclosure are not limited to those mentioned in the above, and other effects that are not mentioned herein could be clearly understood by a person skilled in the art based on the following descriptions.

BEST MODE FOR CARRYING OUT THE INVENTION

Figure 1:
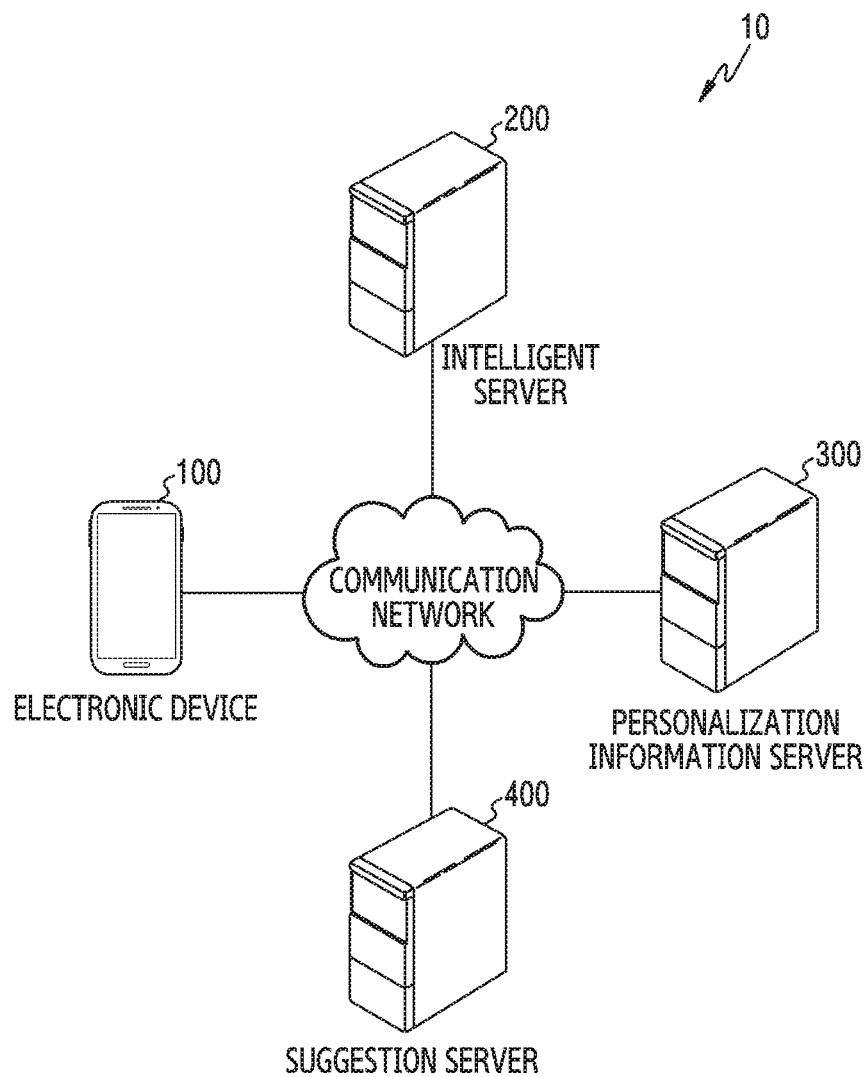
FIG. 1 is a view illustrating an integrated intelligent system according to various embodiments of the disclosure.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). A machine is a device capable of invoking a stored command from a storage medium and operating according to the called command, and may include an electronic device (e.g., intelligent server 200) according to the disclosed embodiments. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Prior to describing an embodiment of the disclosure, an integrated intelligent system to which an embodiment of the disclosure is applicable will be described.

FIG. 1 is a view illustrating an integrated intelligent system according to various embodiments of the disclosure.

Referring to FIG. 1, the integrated intelligent system 10 may include a user terminal 100, an intelligent server 200, a personalization information server 300, or a suggestion server 400.

The user terminal 100 may provide a necessary service to a user through an app (or an application program) (for example, an alarm app, a message app, a photo (gallery) app, etc.) stored in the user terminal 100. For example, the user terminal 100 may execute and operate another app through an intelligent app (or a voice recognition app) stored in the user terminal 100. The user terminal 100 may receive a user input for executing another app and performing the operation through the intelligent app. The user input may be received through, for example, a physical button, a touch pad, a voice input, a remote input, etc. According to an embodiment, the user terminal 100 may correspond to various terminal devices (or electronic devices) connectable to the Internet, such as a mobile phone, a smartphone, a personal digital assistant (PDA), or a notebook computer.

According to an embodiment, the user terminal 100 may receive a user's speech as a user input. The user terminal 100 may receive a user's speech, and may generate a command to operate an app based on the user's speech. Accordingly, the user terminal 100 may operate the app by using the command.

The intelligent server 200 may receive a user voice input from the user terminal 100 through a communication network, and may change the user voice input into text data. In another embodiment, the intelligent server 200 may generate (or select) a path rule based on the text data. The path rule may include information regarding an action (or an operation) for performing a function of an app, or information on a parameter necessary for executing the action. In addition, the path rule may include a sequence of the action of the app. The user terminal 100 may receive the path rule, may select an app according to the path rule, and may execute the action included in the path rule in the selected app.

The term "path rule" used in the description may generally refer to a sequence of states of an electronic device for performing a task requested by a user, but this should not be considered as limiting. In other words, the path rule may include information on the sequence of the states. The task may be a certain action that may be provided by an intelligent app. The task may include generating a schedule, transmitting a photo to a person the user wants to transmit to, or providing weather information. The user terminal 100 may have one or more states (for example, action states of the user terminal 100) in sequence, thereby performing the task.

According to an embodiment, the path rule may be provided or generated by an artificial intelligent (AI) system. The AI system may be a rule-based system, or may be a neutral network-based system (for example, a feedforward neural network (FNN), a recurrent neutral network (RNN)). Alternatively, the AI system may be a combination of the above-mentioned systems, or other AI systems. According to an embodiment, the path rule may be selected from a set of pre-defined path rules, or may be generated in real time in response to a user request. For example, the AI system may select at least a path rule from a plurality of pre-defined path rules, or may generate a path rule dynamically (or in real time). Alternatively, the user terminal 100 may use a hybrid system to provide the path rule.

According to an embodiment, the user terminal 100 may execute the action, and may display a screen corresponding to a state of the user terminal 100 executing the action on a screen. In another example, the user terminal 100 may execute the action and may not display the result of performing the action on the display. For example, the user terminal 100 may execute a plurality of actions, and may display only some of the results of the plurality of actions on the display. The user terminal 100 may display, for example, only the result of executing the final action on the display. In another example, the user terminal 100 may receive a user's input and may display the result of executing the action on the display.

The personalization information server 300 may include a database in which user information is stored. For example, the personalization information server 300 may receive user information (for example, context information, acc execution, etc.) from the user terminal 100, and may store the user information in the database. The intelligent server 200 may receive the user information from the personalization information server 300 through a communication network, and may use the user information in generating a path rule regarding a user input. According to an embodiment, the user terminal 100 may receive the user information from the personalization information server 300 through a communication network, and may use the user information as information for managing the database.

The suggestion server 400 may include a database in which information on a function in the terminal or a function to be introduced or provided by an application is stored. For example, the suggestion server 400 may receive user information of the user terminal 100 from the personalization information server 300, and may include a database regarding a function that may be used by the user. The user terminal 100 may receive the information on the function to be provided from the suggestion server 400 through a communication network, and may provide the information to the user.

Figure 2:
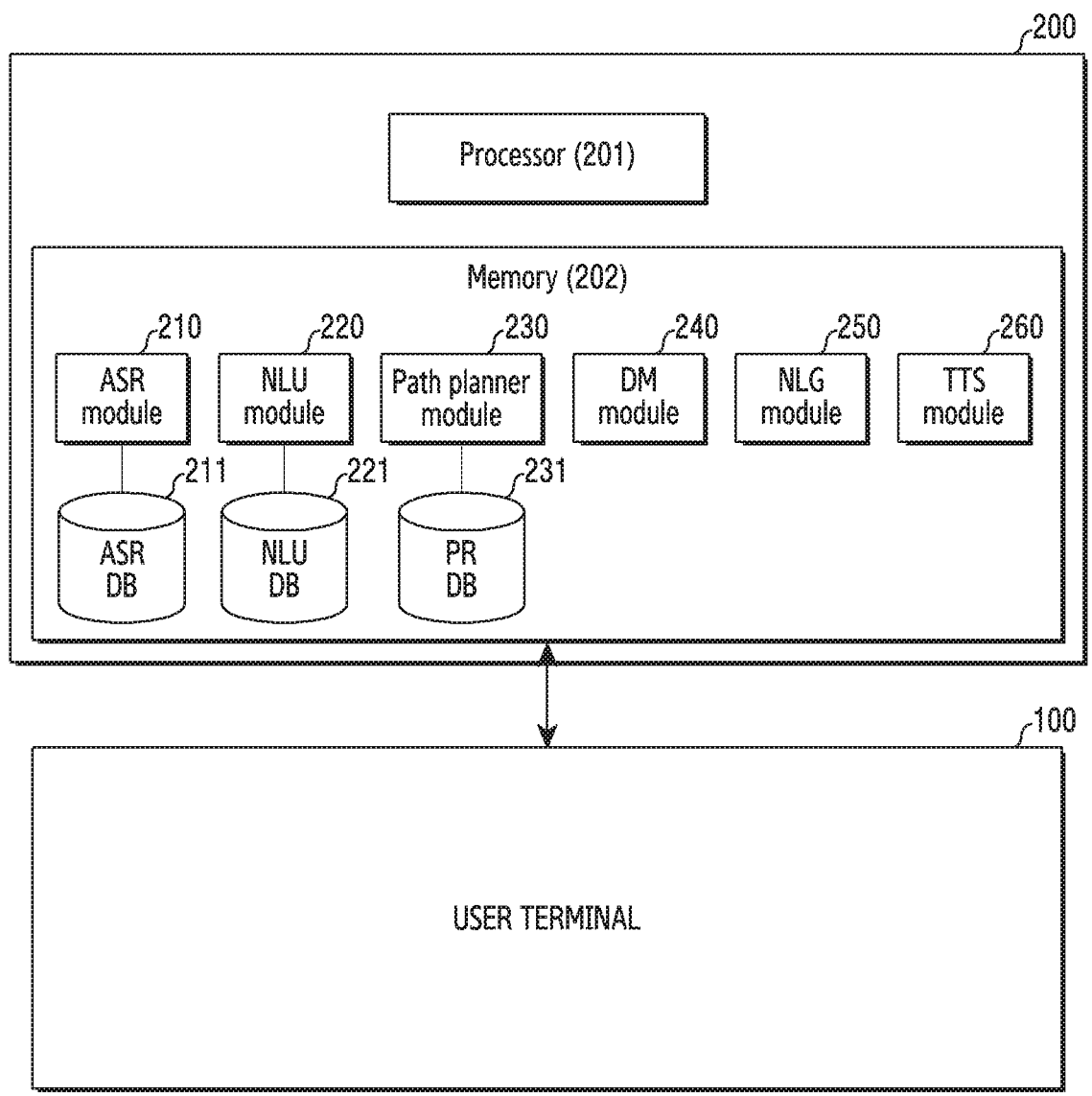
FIG. 2 is a block diagram illustrating an intelligent server of the integrated intelligent system according to an embodiment of the disclosure.

FIG. 2 is a block diagram illustrating the intelligent server of the integrated intelligent system according to an embodiment of the disclosure.

Referring to FIG. 2, the intelligent server 200 may include an automatic speech recognition (ASR) module 210, a natural language understanding (NLU) module 220, a path planner module 230, a dialogue manager (DM) module 240, a natural language generator (NLG) module 250, or a text-to-speech (TTS) module 260. According to an embodiment, the intelligent server 200 may include a communication circuit, a memory (for example, a memory 202), and a processor (for example, a processor 201). For example, the processor 201 may execute an instruction stored in the memory 202 to operate the ASR module 210, the NLU module 220, the path planner module 230, the DM module 240, the NLG module 250, and the TTS module 260. The intelligent server 200 may transmit and receive data (or information) to and from an external electronic device (for example, the user terminal 100) through the communication circuit.

The NLU module 220 or the path planner module 230 of the intelligent server 200 may generate a path rule.

According to an embodiment, the automatic speech recognition (ASR) module 210 may convert a user input received from the user terminal 100 into text data.

According to an embodiment, the ASR module 210 may convert a user input received from the user terminal 100 into text data. For example, the ASR module 210 may include a speech recognition module. The speech recognition module may include an acoustic model and a language model. For example, the acoustic model may include information related to vocalization, and the language model may include unit phoneme information and information on a combination of unit phoneme information. The speech recognition module may convert a user speech into text data by using the information related to vocalization and the information on the unit phoneme information. Information on the acoustic model and the language model may be stored in, for example, an automatic speech recognition database (ASR DB) 211.

According to an embodiment, the NLU module 220 may understand a user intent by performing syntactic analysis or semantic analysis. The syntactic analysis may divide a user input into syntactic units (for example, a word, a phrase, a morpheme, etc.), and may understand what syntactic element the divided unit has. The semantic analysis may be performed by using semantic matching, rule matching, formula matching, etc. Accordingly, the NLU module 220 may obtain a certain domain, an intent of a user input, or a parameter (or a slot) necessary for representing the intent.

According to an embodiment, the NLU module 220 may determine a user's intent and a parameter by using a matching rule divided into a domain, an intent, and a parameter (or slot) necessary for understanding the intent. For example, the one domain (for example, an alarm) may include a plurality of intents (for example, setting an alarm, disabling an alarm, etc.), and a plurality of parameters (for example, time, the number of times of repetition, an alarm sound, etc.) may be required to perform one intent. A plurality of rules may include, for example, one or more essential parameters. The matching rule may be stored in a natural language understanding database (NLU DB) 221.

According to an embodiment, the NLU module 200 may be based on a statistical model as well as a rule-based model. According to an embodiment, the NLU module 220 may utilize the statistical model to determine a domain, an intent, a parameter. The statistical model may refer to machine learning models of various types, and for example, may include a neural network model. For example, different neural network models may be used to detect a domain, an intent, a parameter (or a slot).

According to an embodiment, the NLU module 220 may understand a meaning of a word extracted from a user input, by using linguistic features (syntactic elements) such as a morpheme, a phrase, etc., and may determine a user's intent by matching the understood meaning of the word with a domain and an intent. For example, the NLU module 220 may determine the user's intent by calculating how many words, extracted from the user input, are included in the respective domains and intents. According to an embodiment, the NLU module 220 may determine a parameter of the user input by using the word which is a basis for understanding the intent. According to an embodiment, the NLU module 220 may determine the user's intent by using the NLU DB 221 in which linguistic features for understanding the intent of the user input are stored. According to another embodiment, the NLU module 220 may determine the user's intent by using a personal language model (PLM). For example, the NLU module 220 may determine the user's intent by using personalized information (for example, a list of contacts, a music list). The personal language model may be stored in, for example, the NLU DB 221. According to an embodiment, not only the NLU module 220 but also the ASR module 210 may recognize a user's voice with reference to the personal language model stored in the NLU DB 221.

According to an embodiment, the NLU module 220 may generate a path rule based on the intent of the user input and the parameter. For example, the NLU module 220 may select an app to be executed, based on the intent of the user input, and may determine an action to be performed in the selected app. The NLU module 220 may determine the parameter corresponding to the determined action and may generate the path rule. According to an embodiment, the path rule generated by the NLU module 220 may include information on the app to be executed, the action to be executed in the app (for example, at least one state), and the parameter necessary for executing the action.

According to an embodiment, the NLU module 220 may generate one path rule or a plurality of path rules based on the intent of the user input and the parameter. For example, the NLU module 220 may receive a path rule set corresponding to the user terminal 100 from the path planner module 230, and may map the intent of the user input and the parameter onto the received path rule set, and may determine the path rule.

According to another embodiment, the NLU module 220 may determine an app to be executed based on the intent of the user input and the parameter, an action to be executed in the app, and a parameter necessary for executing the action, and may generate one path rule or a plurality of path rules. For example, the NLU module 220 may generate the path rule by arranging the app to be executed and the action to be executed in the app in the form of ontology or graph model according to the intent of the user input by using the information of the user terminal 100. The generated path rule may be stored in a path rule database (PR DB) 231 through the path planner module 230. The generated path rule may be added to the path rule set of the database 231.

According to an embodiment, the NLU module 220 may select at least one path rule from the generated plurality of path rules. For example, the NLU module 220 may select an optimum path rule from the plurality of path rules. In another example, the NLU module 220 may select a plurality of path rules when only some actions are specified based on a user speech. The NLU module 220 may determine one path rule from the plurality of path rules by a user's additional input.

According to an embodiment, the NLU module 220 may transmit the path rule to the user terminal 100 according to a request on the user input. For example, the NLU module 220 may transmit one path rule corresponding to the user input to the user terminal 100. In another example, the NLU module 220 may transmit a plurality of path rules corresponding to the user input to the user terminal 100. The plurality of path rules may be generated by the NLU module 220 when only some actions are specified based on a user speech.

According to an embodiment, the path planner module 230 may select at least one path rule from the plurality of path rules.

According to an embodiment, the path planner module 230 may transmit the path rule set including the plurality of path rules to the NLU module 220. The plurality of path rules of the path rule set may be stored in the path rule database 231 connected to the path planner module 230 in the form of a table. For example, the path planner module 230 may transmit, to the NLU module 220, a path rule set corresponding to information (for example, OS information, app information) of the user terminal 100 received from an intelligent agent 145. The table stored in the path rule database 231 may be stored by domain or domain version.

According to an embodiment, the path planner module 230 may select one path rule or a plurality of path rules from the path rule set, and may transmit the path rule to the NLU module 220. For example, the path planner module 230 may match the user's intent and the parameter with the path rule set corresponding to the user terminal 100, and may select one path rule or the plurality of path rules and may transmit the path rule to the NLU module 220.

According to an embodiment, the path planner module 230 may generate one path rule or a plurality of path rules by using the user intent and the parameter. For example, the path planner module 230 may determine an app to be executed based on the user intent and the parameter, and an action to be performed in the app, and may generate one path rule or the plurality of path rules. According to an embodiment, the path planner module 230 may store the generated path rule in the path rule database 231.

According to an embodiment, the path planner module 230 may store the path rule generated in the NLU module 220 in the path rule database 231. The generated path rule may be added to the path rule set stored in the path rule database 231.

According to an embodiment, the table stored in the path rule database 231 may include the plurality of path rules or the plurality of path rule sets. The plurality of path rules or the plurality of path rule sets may reflect a kind, a version, a type, or characteristics of a device performing the respective path rules.

According to an embodiment, the DM module 240 may determine whether the user's intent understood by the NLU module 220 is clear. For example, the DM module 240 may determine whether the user's intent is clear, based on whether information of the parameter is enough. The DM module 240 may determine whether the parameter understood by the NLU module 220 is enough to perform the task. According to an embodiment, when the user's intent is not clear, the DM module 240 may perform feedback to request necessary information from the user. For example, the DM module 240 may perform feedback to request information on the parameter for understanding the user's intent.

According to an embodiment, the DM module 240 may include a content provider module. The content provider module may generate a result of performing the task corresponding to the user input when the action is performed based on the intent and the parameter understood by the NLU module 220. According to an embodiment, the DM module 240 may transmit the result generated at the content provider module to the user terminal 100 in response to a user input.

According to an embodiment, the NLG module 250 may change designated information to a text form. The information changed to the text form may be a form of a natural language speech. The designated information may be, for example, information on an additional input, information for guiding completion of the action corresponding to the user input, or information for guiding an additional input of the user (for example, feedback information on the user input). The information changed to the text form may be transmitted to the user terminal 100 and may be displayed on the display 120, or may be transmitted to the TTS module 260 and may be changed to a speech form.

According to an embodiment, the TTS module 260 may change information in a text form to information in a speech form. The TTS module 260 may receive information in a text form from the NLG module 250, and may change the information in the text form to information in a speech form and may transmit the information to the user terminal 100. The user terminal 100 may output the information in the speech form to a speaker.

According to an embodiment, the NLU module 220, the path planner module 230, and the DM module 240 may be implemented as one module. For example, the NLU module 220, the path planner module 230, and the DM module 240 may be implemented as one module, and may determine a user's intent and a parameter and may generate a response (for example, a path rule) corresponding to the user's intent and the parameter determined. Accordingly, the generated response may be transmitted to the user terminal 100.

A system related to an artificial neutral network model according to various embodiments may include a device for training the artificial neutral network model, and a device (for example, a device functionally connected with the intelligent server 200 or the NLU module 220) having the trained artificial neutral network model implemented therein. The device for training the artificial neutral network model and the device (for example, the device connected with the intelligent server 200 or the NLU module 220) having the trained artificial neutral network model implemented therein may be processor-based devices. The device for training the artificial neutral network model and the device (for example, the device connected with the intelligent server 200 or the NLU module 220) having the trained artificial neutral network model implemented therein may include a processor (for example, the processor 201) and a memory (for example, the memory 202) connected with the processor.

In various embodiments, there are provided an electronic device and a method for understanding (or analyzing) human language by using an artificial neutral network (for example, a recurrent neutral network (RNN)). The method according to various embodiments may be performed by the intelligent server 200 or the NLU module 220. For example, the method may be implemented in the memory 202 or the NLU module 220. For example, the memory 202 (or the NLU module 220) may implement (or store) an artificial neutral network (for example, an RNN) for understanding human language according to various embodiments. The method according to various embodiments may be performed by a device for training an artificial neural network model to be embedded in the intelligent server 200 (or the NLU module 220).

The electronic device according to various embodiments may include a device related to the intelligent server 200, the NLU module 220, or a device for training an artificial neutral network model to be embedded in the intelligent server 200 (or the NLU module 220).

In a spoken dialogue system or a goal-oriented dialogue system, slot filling and intent detection may be related to an action for understanding a user speech based on semantic frames mainly pre-designed. The slot filling may indicate an action for identifying a sequence of a token and extracting a semantic element from a speech. The intent detection may indicate an action for classifying an intent of a user speech.

In various embodiments, in multi-task learning of an intent and a domain, a domain classification problem including domain scaling and adaption problems may not be considered. In various embodiments, only a problem that the intent and the slot are learned in common may be considered.

A role or a meaning of a word may vary according to how long a focused portion in a sentence is. That is, the role or meaning of the word may vary according to a length of a portion that is considered to analyze the role or meaning of the word in the sentence. For example, in the sentence "send how about dinner tonight to him," the meaning of the word "tonight" may vary. For example, the word "tonight" may mean a time for the dinner based on "how about dinner tonight," but may be a portion of the main text "send~to him".

To solve the above-described problem, an electronic device and a method according to various embodiments may provide a new attention mechanism which is known as long-term aware attention (LA) in a recurrent neutral network (RNN). The long-term aware attention mechanism may have two layers of the RNN stacked one on another, and may utilize the two layers as a pair of a short-term memory and a long-term memory. A first layer (for example, a layer of a lower stage) of the two layers may indicate the short-term memory or relatively local information. A second layer (for example, a layer of an upper stage) of the two layers may indicate the long-term memory or relatively global information. In the long-term aware attention mechanism, the first layer may be used for a key and a value, and the second layer may be used for a key.

However, this should not be considered as limiting. For example, the RNN in the long-term aware attention mechanism may include a plurality of layers. Some layers of the plurality of layers may be short-term memories and may be used as a key and a value. Some other layers of the plurality of layers may be long-term memories and may be used as a key. For example, some layers may be positioned at a lower stage in the RNN than some other layers.

In various embodiments, an RNN model which integrates the LA mechanism can increase effectiveness and efficiency in the action of training the model and the performance of the model. The RNN model integrating the LA mechanism as described above may be referred to as an LA-RNN model. The LA-RNN model may be based on a character, not based on a word. However, this should not be considered as limiting.

In various embodiments, the LA-RNN model may be trained by multi-task learning of a character-based language model having a weight-decay hyper-parameter, in order to enhance stability and availability of a character-based representation. The character-based language model having the weight-decay hyper-parameter may serve as a regularizer in terms of a slot filling cost and an intent detection cost.

In various embodiments, new positional encoding used in the LA-RNN model may be referred to as light-house positional encoding. The light-house positional encoding may consider a relative distance between a current position and a comparison position. The light-house positional encoding may define one trained embedding, unlike position-wise encoding and fixed encoding. The light-house positional encoding may not be positioned at a starting representation of an encoder and a decoder, and may be positioned only within attention calculation.

The slot filling may be one of the sequence labeling problems, and the intent detection may be processed as a classification problem having various output labels. For example, the slot may be a parameter necessary for representing an intent.

TABLE 1

| sentence | find | flights | to | new | york | tomorrow |
|---|---|---|---|---|---|---|
| slots | O | O | O | B-toloc | I-toloc | B-date |
| intent | | | | find_flight | | |
| sentence | text | to | mary | that | sad | puppy | noise |
| slots | O | O | B-recipient | O | B-text | I-text | I-text |
| intent | | | | send_message | | |

For example, referring to table 1, a flight domain may include, as a list of intents, find_flight indicating an intent to find a flight, find_airfare indicating an intent to find an airfare, and find_distance indicating an intent to find a flight distance. In addition, the flight domain may include, as a list of slots, toloc which is a slot related to a point of departure, fromloc which is a slot related to a destination, date which is a slot related to weather, and flight_number which is a slot related to a flight number.

The slot filling task may be finding alignment between a slot and a given user query. The intent detection task may be instantiating one or more intents in the list of intents from the given user query. For example, this may be expressed by the following equation:

$$f_{slot}: X \to \gamma$$

$$f_{intent}: X \to \gamma'$$

$$X = x_1, x_2, \ldots, x_{T_x}$$

$$\gamma = y_1, y_2, \ldots, y_{T_x}$$

$$\gamma' = y'_1, y'_2, \ldots, y'_n \quad \text{Equation 1}$$

Referring to Equation 1, $f_{slot}$ may be a function corresponding to slot filling, and $f_{intent}$ may be a function corresponding to intent detection. $X = x_1, x_2, \ldots, x_{T_x}$ may indicate an input sequence, $T_x$ may indicate a length of the input sequence, $\gamma = y_1, y_2, \ldots, y_{T_x}$ may indicate a label sequence corresponding to the input sequence, $\gamma' = y'_1, y'_2, \ldots, y'_n$ may indicate intent labels, and n may indicate the number of intents.

$f_{slot}$ for slot filling may be a function for mapping the input sequence $X = x_1, x_2, \ldots, x_{T_x}$ onto the corresponding label sequence $\gamma = y_1, y_2, \ldots, y_{T_x}$. In a system related to an LA-RNN model according to various embodiments, a device for training the LA-RNN model may learn $f_{slot}$. In the system related to the LA-RNN model, a device (for example, the intelligent server 200 or the NLU module 220) having the LA-RNN model implemented therein may obtain, from the input sequence X, the label sequence γ indicating slots corresponding to the input sequence by using $f_{slot}$.

$f_{intent}$ for intent detection may be a function for mapping the input sequence $X = x_1, x_2, \ldots, x_{T_x}$ onto the intent labels $\gamma' = y'_1, y'_2, \ldots, y'_n$. In the system related to the LA-RNN model according to various embodiments, the device for training the LA-RNN model may learn $f_{intent}$. In the system related to the LA-RNN model, the device (for example, the intelligent server 200 or the NLU module 220) having the LA-RNN model implemented therein may obtain, from the input sequence X, the intent labels γ' based on the input sequence by using $f_{intent}$.

For example, referring to table 1, the sequence (for example, γ) of the slots may have a form of IOB labels having three outputs corresponding to "B" as beginning of the slots, "T" as continuation of the slots, and "O" as absence of the slots.

Figure 3:
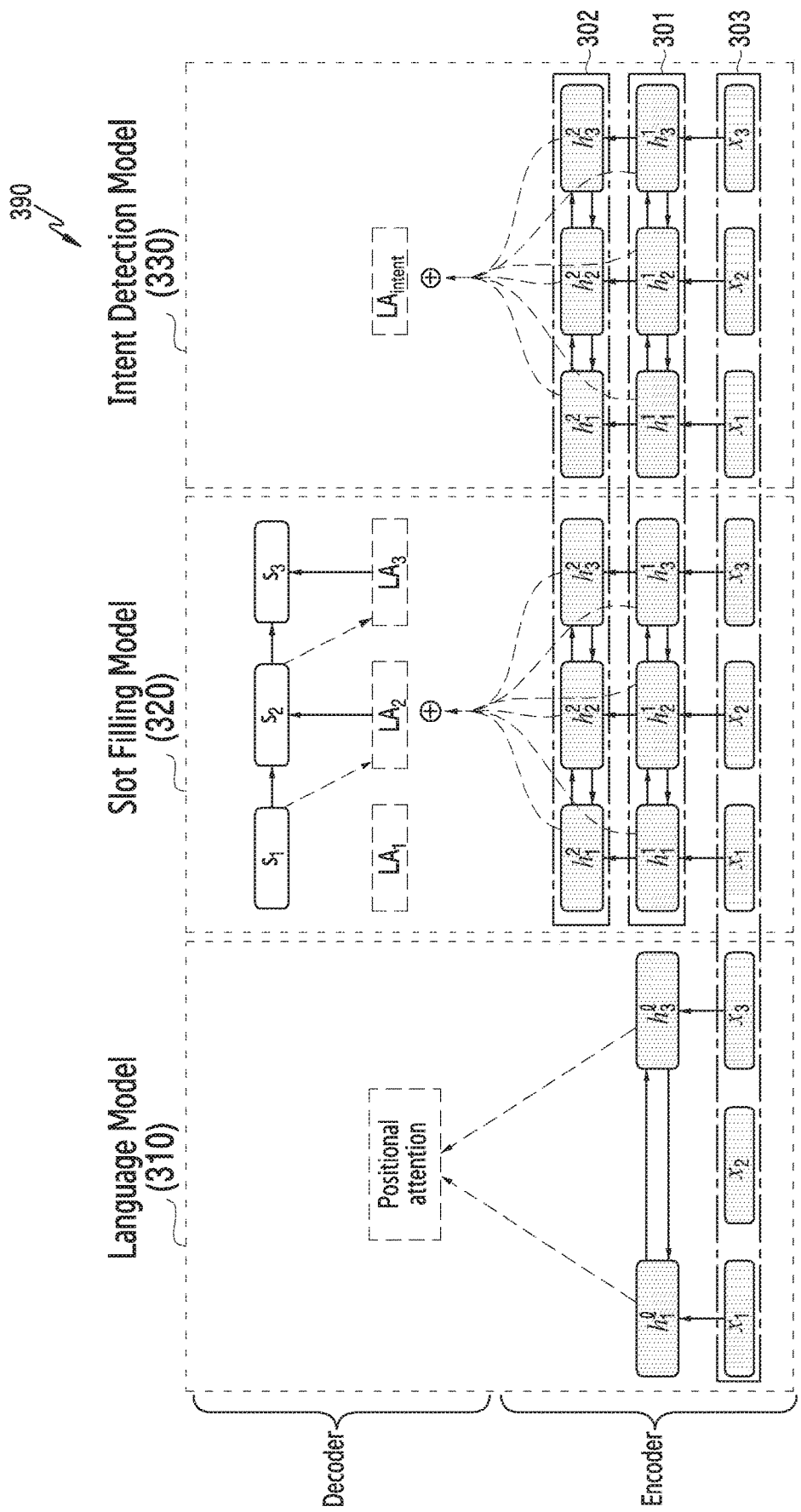
FIG. 3 is a view illustrating examples of a language model, a slot filling model, and an intent detection model according to various embodiments.

FIG. 3 illustrates examples of a language model, a slot filling model, and an intent detection model according to various embodiments. In various embodiments, a task model may indicate a slot filling model 320 and an intent detection model 330.

Referring to FIG. 3, in a system 390 related to an LA-RNN model according to various embodiments, a device for training the LA-RNN model may perform multi-task learning. The device (for example, a processor-based device) for training the LA-RNN model may train the language model 310, the slot filling model 320, and the intent detection model 330, simultaneously (or in parallel, at a time). The trained slot filling model 320 and the trained intent detection model 330 may be implemented or stored in the memory 202 of the intelligent server 200 (or the NLU module 220).

According to an embodiment, the slot filling model 320 and the intent detection model 330 may be trained by supervised learning. For example, the slot filling model 320 and the intent detection model 330 may be trained based on a designated label. According to an embodiment, the language model 310 may be trained by unsupervised learning. For example, the language model 310 may be trained without a designated label. The language model 310 may be trained with only an input sequence (for example, a sentence) being given without a label.

In various embodiments, the language model 310, the slot filling model 320, and the intent detection model 330 may include an encoder and a decoder. The encoder and the decoder may include at least one RNN layer. For example, the encoder RNN in FIG. 3 may include a plurality of layers (for example, 303, 301, 302). The encoder may configure hidden representations from an input through the RNN. For example, the encoder may store information on a meaning indicated by an element (for example, a word) of a sentence as hidden representations. The decoder may obtain necessary information (for example, information on a slot, information on an intent) by using hidden representations (for example, $h_1^1, h_2^1, h_3^1, h_1^2, h_2^2, h_3^2$, etc.) finally configured at the encoder.

In various embodiments, a training action of the language model 310, a training action of the slot filling model 320, and a training action of the intent detection model 330 may share a portion for multi-task learning. The training actions of the three models 310, 320, 330 may share one or more parameters.

The training actions of the three models 310, 320, 330 may share the layer 303 related to the input sequence or representations (for example, $x_1$, $x_2$, $x_3$) obtained from the layer 303 at the encoder RNN. The training actions of the task models (for example, the slot filling model 320, the intent detection model 330) may share the first layer 301 and the second layer 302 from among the plurality of layers included in the encoder RNN, or hidden representations (for example, $h_1^1$, $h_2^1$, $h_3^1$) obtained from the first layer 301 and hidden representations (for example, $h_1^2$, $h_2^2$, $h_3^2$) obtained from the second layer 302. An index will be described below with reference to FIG. 4.

In various embodiments, the slot filling model 320 and the intent detection model 330 which are trained by the multi-task learning method may be stored (or implemented) in the device (for example, the intelligent server 200 or the NLU module 220) having the LA-RNN model implemented therein.

In various embodiments, representations $x_1$, $x_2$, $x_3$ may be configured from the input sequence through the layer 303 of the encoder RNN. For example, $x_1$, $x_2$, $x_3$ may be representations indicating a word. For example, $x_1$, $x_2$, $x_3$ may be a final output regarding the layer 303.

$x_1$, $x_2$, $x_3$ may be used as an input of the first layer 301 of the encoder RNN. The hidden representations $h_1^1$, $h_2^1$, $h_3^1$ may be configured from $x_1$, $x_2$, $x_3$ through the first layer 301. $h_1^1$, $h_2^1$, $h_3^1$ may store information on a short-term memory regarding a local portion (for example, local words). For example, $h_1^1$, $h_2^1$, $h_3^1$ may be a final output regarding the first layer 301.

$h_1^1$, $h_2^1$, $h_3^1$ may be used as an input of the second layer 302 of the encoder RNN. The hidden representations $h_1^2$, $h_2^2$, $h_3^2$ may be configured from $h_1^1$, $h_2^1$, $h_3^1$ through the second layer 302. $h_1^2$, $h_2^2$, $h_3^2$ may store information on a long-term memory regarding a global portion (for example, global words). For example, $h_1^2$, $h_2^2$, $h_3^2$ may be a final output regarding the second layer 302.

$h_1^1$, $h_2^1$, $h_3^1$, $h_1^2$, $h_2^2$, $h_3^2$ may be used as an input of the decoder RNN. $h_1^1$, $h_2^1$, $h_3^1$, $h_1^2$, $h_2^2$, $h_3^2$ may be used to obtain necessary information (for example, information on a slot, information on an intent) at the decoder RNN. $h_1^1$, $h_2^1$, $h_3^1$, $h_1^2$, $h_2^2$, $h_3^2$ may be used to configure an attention (that is, the long-term aware attention (LA)) regarding necessary information at the decoder RNN. For example, the decoder may include one or more RNNs. The decoder RNN may configure $LA_1$, $LA_2$, $LA_3$ indicating the long-term aware attention (LA) regarding the slot from $h_1^1$, $h_2^1$, $h_3^1$, $h_1^2$, $h_2^2$, $h_3^2$ through the one or more decoder RNNs. The decoder RNN may configure $LA_{intent}$ indicating the long-term aware attention (LA) regarding the intent from $h_1^1$, $h_2^1$, $h_3^1$, $h_1^2$, $h_2^2$, $h_3^2$ through the one or more decoder RNNs.

A method for obtaining the long-term aware attention from hidden representations with respect to the slot filling model 320 may be expressed by the following equation, for example:

$$LA_i = \sum_{j=1}^{T_x} \alpha_{ij} h_j^1$$

$$\alpha_{ij} = \frac{\exp(e_{ij})}{\sum_{k=1}^{T_x} \exp(e_{ik})}$$

$$e_{ij} = a(s_{i-1}, h_j^1, h_j^2)$$

Equation 2

Referring to Equation 2, j may indicate a sequential index of an input (for example, a word), $s_{i-1}$ may indicate a decoder state at the i-th step of decoding, $LA_i$ may indicate an attention vector regarding the i-th step of decoding, and $\alpha_{ij}$ may indicate a position-wise weight regarding $s_{i-1}$, which is obtained by an $\alpha$ function. $h_j^1$ may indicate a hidden representation of the first layer of the encoder RNN, and $h_j^2$ may indicate a hidden representation of the second layer of the encoder RNN.

$s_{i-1}$ may be a hidden representation positioned at the decoder RNN. $s_{i-1}$ may indicate information that has been processed up to the present time in the processing action of the decoder RNN to obtain a current (that is, the i-th step) output. In the LA-RNN model according to various embodiments, $s_{i-1}$ may be used as a query. That is, in the LA-RNN model according to various embodiments, the slot filling model 320 may obtain the long-term aware attention or the current (that is, the i-th step) output, based on information $h_j^1$, $h_j^2$ positioned in the encoder RNN, by using $s_{i-1}$.

The LA-RNN model (for example, the slot filling model 320) according to various embodiments may obtain the long-term aware attention (LA) by using hidden representations of the encoder RNN. The LA-RNN model may use, as a key and a value, hidden representations (that is, $h_1^1$, $h_2^1$, $h_3^1$) configured from the layer of the lower stage (that is, the first layer 301) from among the plurality of layers included in the encoder RNN. The LA-RNN model may use, as a key, hidden representations (that is, $h_1^2$, $h_2^2$, $h_3^2$) configured from the layer of the upper stage (that is, the second layer 302) from among the plurality of layers included in the encoder RNN.

Referring to $e_{ij}=a(s_{i-1}, h_j^1, h_j^2)$ in Equation 2, the LA-RNN model may obtain an input $e_{ij}$ for obtaining a weight $\alpha_{ij}$ by using the query $s_{i-1}$, key $h_j^1$ and key $h_j^2$. For example, the weight $\alpha_{ij}$ may include information regarding how important each piece of information (for example, $h_j^1$, $h_j^2$) of the encoder RNN considered is. That is, in various embodiments, the LA-RNN model may use $h_j^1$ and $h_j^2$ as a key.

Referring to $LA_i=\sum_{j=1}^{T_x} \alpha_{ij} h_j^1$ in Equation 2, the LA-RNN model may obtain information on the long-term aware attention (LA) by performing a weighted sum operation of multiplying respective weights $\alpha_{ij}$ and respective values $h_j^1$ and then adding the multiplication values. That is, in various embodiments, the LA-RNN model may use $h_j^1$ as a key. The LA-RNN model may not use the hidden representations (that is, $h_j^2$) configured from the layer of the upper stage (that is, the second layer 302) as a value.

In various embodiments, the number of the first layers 301 and the number of the second layers 302 are not limited thereto. For example, the LA-RNN model may use three layers of a lower stage as a key and a value from among layers of 5 stages included in the encoder RNN, and may use two layers of an upper stage as a key.

As described above, the electronic device and the method according to various embodiments may use, as a key and a value, some layers (for example, a layer of the lower stage, the first layer 301) from among the plurality of layers included in the encoder RNN, and may use some other layers (for example, a layer of the upper stage, the second layer 302) as a key, such that long-term memory information or relatively global information can be memorized better.

In various embodiments, the intent detection model 330 may perform a corresponding action as described above.

Figure 4A:
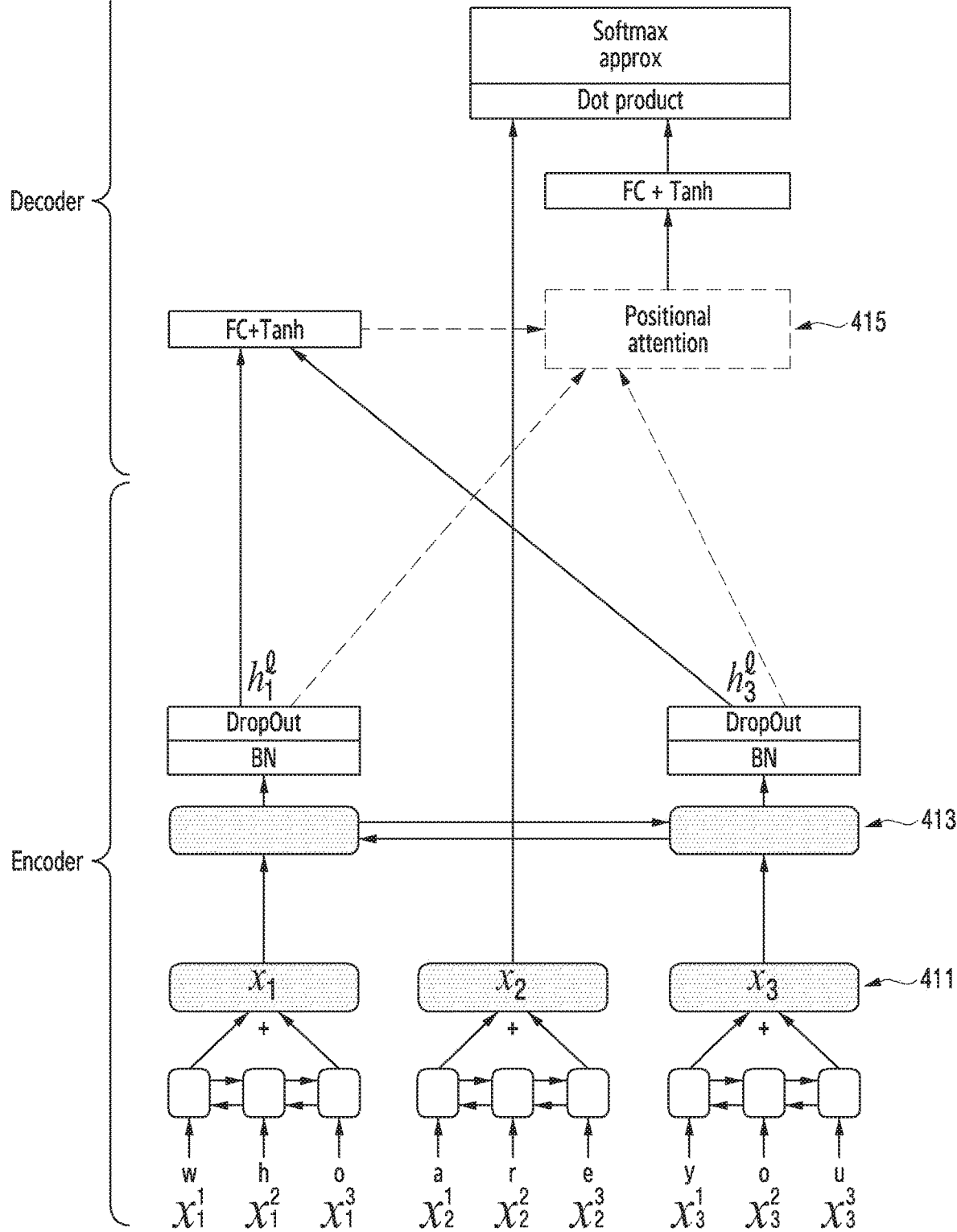
FIG. 4A is a view illustrating another example of the language model according to various embodiments.

FIG. 4A illustrates another example of the language model according to various embodiments. Referring to FIG. 4A, a structure of a language model 410 may include a character-based input 411 except for an arbitrarily selected word, one encoding layer 413, and a positional attention 415. The positional attention 415 may be configured by using light-house positional encoding. In a training action of the language model, normalization related to softmax approximation may be used.

Figure 4B:
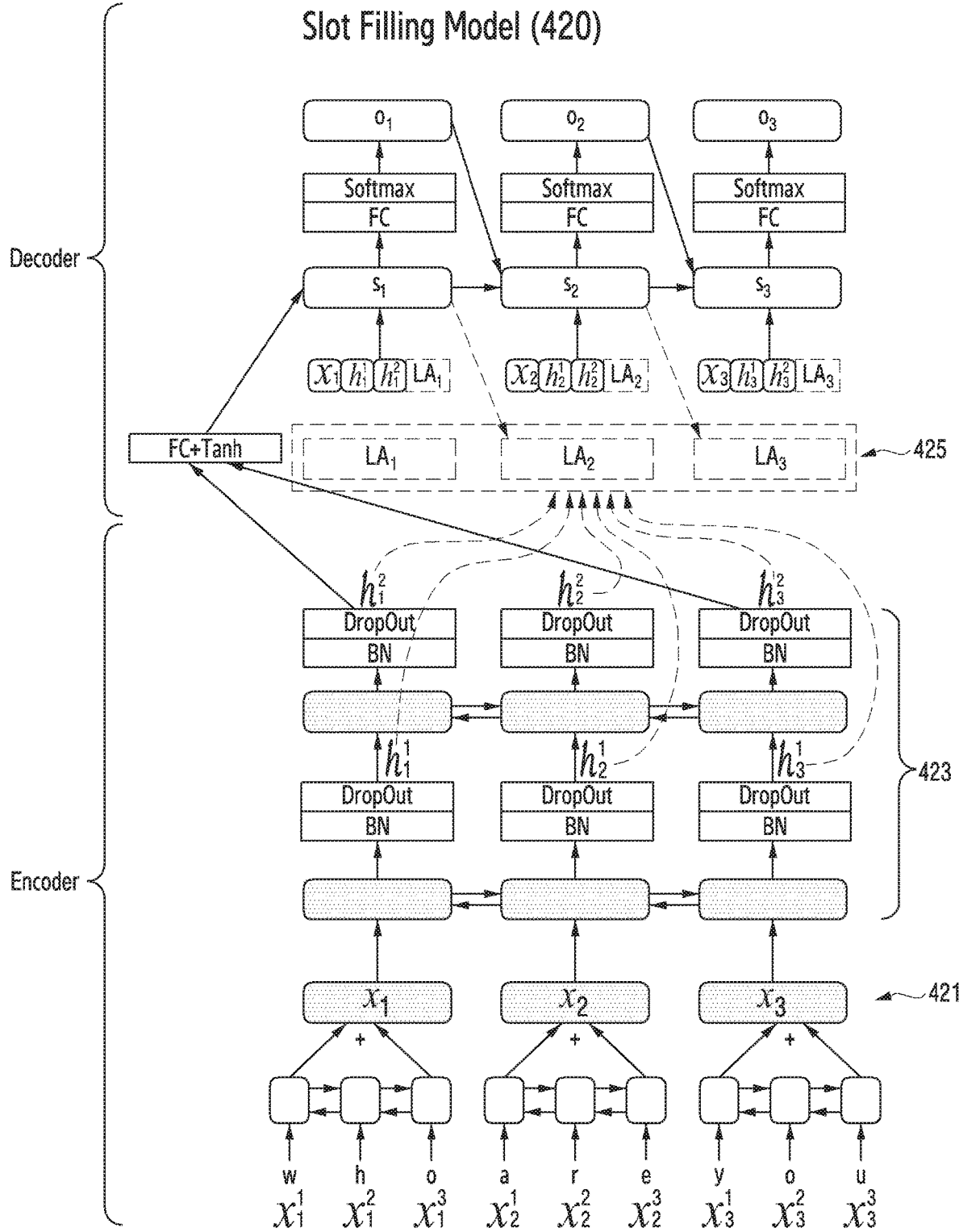
FIG. 4B is a view illustrating another example of the slot filling model according to various embodiments.

FIG. 4B illustrates another example of the slot filling model according to various embodiments. Referring to FIG. 4B, a structure of a slot filling model 420 may include a character-based input 421, two encoding layers 423, and a long-term aware attention 425 (for example, $LA_1$, $LA_2$, $LA_3$). The long-term aware attention 425 (for example, $LA_1$, $LA_2$, $LA_3$) may be combined with the light-house positional encoding.

Figure 4C:
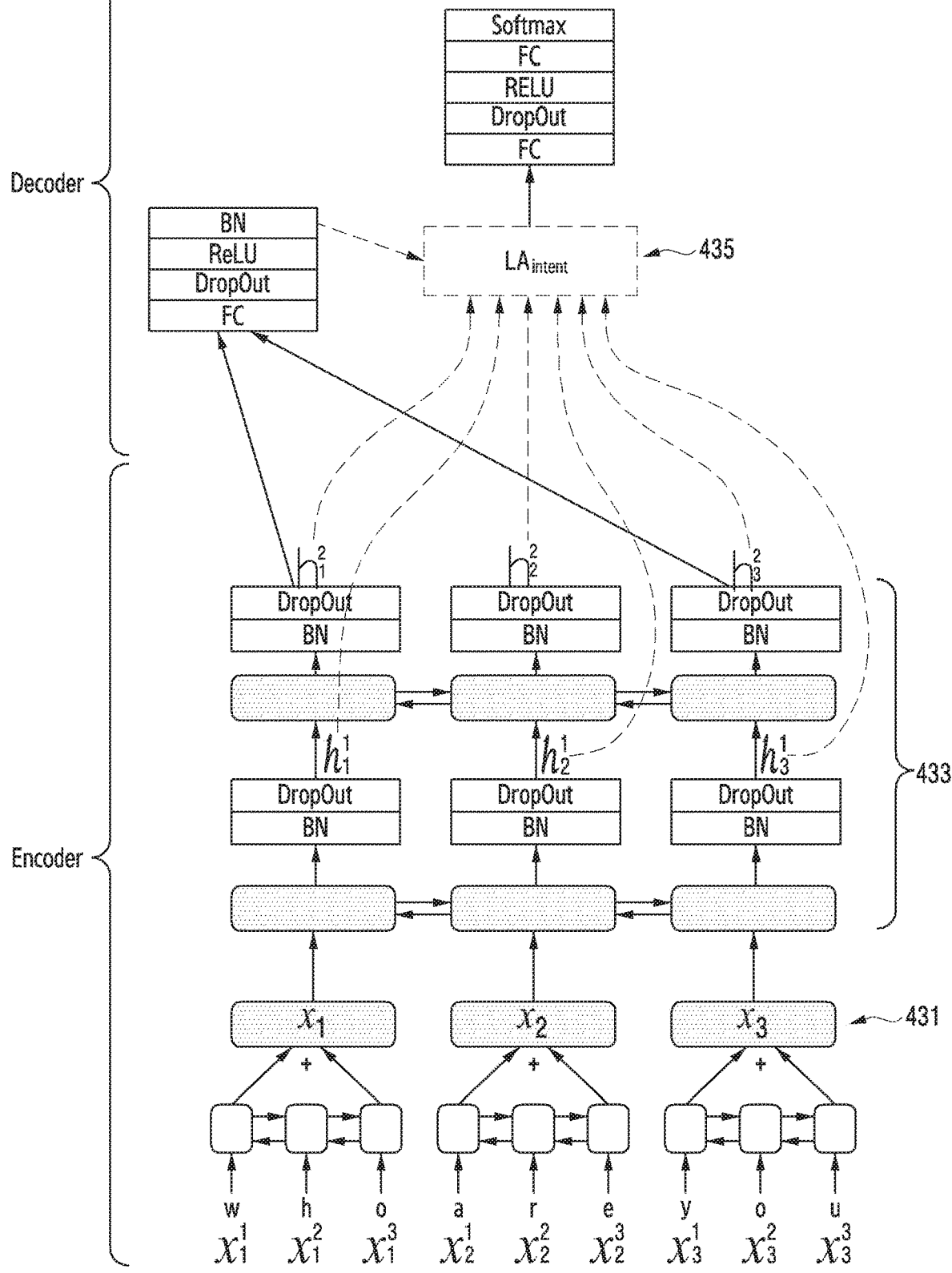
FIG. 4C is a view illustrating another example of the intent detection model according to various embodiments.

FIG. 4C illustrates another example of the intent detection model according to various embodiments. Referring to FIG. 4C, a structure of an intent detection model 430 may include a character-based input 431, two encoding layers 433, and a long-term aware attention 435 (for example, $LA_{intent}$). The long-term aware attention 435 (for example, $LA_{intent}$) may be combined with light-house positional encoding based on a position of a last word.

In various embodiments, a device (for example, a processor-based device) for training the LA-RNN model (for example, 410, 420, 430) may train the language model 410, the slot filling model 420, and the intent detection model 430, simultaneously (or in parallel, at a time). The trained slot filling model 420 and the trained intent detection model 430 may be implemented or stored in the memory 202 of the intelligent server 200 (or the NLU module 220).

Referring to FIGS. 4A, 4B, 4C, an input of an artificial neural network (RNN) may be a sequence of characters $x_i^j$. i may be an index indicating a word. j may be an index indicating a character in a word. In various embodiments, the LA-RNN model may include task models indicating the slot filling model 420 and the intent detection model 430, and the language model 410.

In various embodiments, the three models 410, 420, 430 may share layers 411, 421, 431 related to character embedding (for example, vector) and a word. The task models 420, 430 may share two encoding layers (for example, 423, 433), in addition to the layers (for example, 411, 421, 431) related to the character embedding and the word.

In various embodiments, the artificial neural network (for example, the RNN) may be configured with a hidden encoding representation $h_i^k$ k may be indexes of layers and may be 1, 2, and l. k may be 1 as an index of a first encoding layer (for example, a layer of a lower stage) of the task models 420, 430, may be 2 as an index of a second encoding layer (for example, a layer of an upper stage) of the task models 420, 430, or may be l as an index of the first layer 413 of the language model 410. In addition, the slot filling model 420 may use a sequential output as an input of the next decoder in the form of slot label embeddings (for example, vectors) $o_i$.

The electronic device and the method according to various embodiments may provide the positional attention 415 of the language model 410 and attention vectors 425, 435 of the task models 420, 430. Various embodiments may use a bi-directional gated recurrent unit (GRU) (Chung et al., 2014) as an RNN. Various embodiments may use addition of final states of a forward direction RNN and a backward direction RNN to configure a word representation (for example, 411, 421, 431) from character embeddings. Various embodiments may concatenate the respective states of the forward direction RNN and the backward direction RNN. Positions of dropout (Srivastava et al., 2014) and batch normalization (Ioffe and Szegedy, 2015), selection of an activation function, and concatenation of inputs of a decoder may be obtained from experiments.

In various embodiments, a character-based input may be used. When a word embedding is used, sizes of the word embeddings may greatly exceed the number of other parameters with respect to many word tasks. In addition, the character-based approach method may perform more stable processing with respect to words that are not known or are rare than a word-based approach method. A word representation based on the character embedding may be useful in detecting a spelling form and a semantic function. A word representation based on the character embedding may be more useful in distinguishing morphemes such as prefixes or suffixes than the word embedding. However, this should not be considered as limiting and a word-based input may be used.

An attention mechanism of an alignment-based RNN model may be expressed by the following equation (Mnih et al., 2014; Bandanau et al., 2015; Firat et al., 2016):

$$c_i = \sum_{j=1}^{T_x} \alpha_{ij} h_j \qquad \text{Equation 3}$$

$$\alpha_{ij} = \frac{\exp(e_{ij})}{\sum_{k=1}^{T_x} \exp(e_{ik})}$$

$$e_{ij} = f(s_{i-1}, h_j)$$

Referring to Equation 3, j may indicate a sequential index of a word, $s_{i-1}$ may indicate a decoder state at the i-th step of decoding, $c_i$ may indicate an attention vector related to the i-th step of decoding, and $\alpha_{ij}$ may indicate a position-wise weight regarding $s_{i-1}$, which is obtained by an f function.

In Equation 3, a query of attention may be a current decoder state $s_{i-1}$, and a key and a value of attention may be each $h_i$. The attention weight $\alpha_{ij}$ may be obtained based on a neural network f based on the query and the key, and softmax. The final attention $c_i$ may be obtained by a weighted sum of attention weights (that is, $\alpha_{ij}$) and values.

Considering that a role or a meaning of a word varies according to how long a focused portion in a sentence is, an RNN model having a long-term aware attention (LA) mechanism according to various embodiments (that is, the LA-RNN model (for example, 420, 430)) may have two layers of the RNN stacked one on another in an encoder, and may utilize the two layers as a pair of a short-term memory and a long-term memory. A first layer (for example, a layer of a lower stage) of the two encoder RNN layers may indicate the short-term memory or relatively local information. A second layer (for example, a layer of an upper stage) of the two layers may indicate the long-term memory or relatively global information. In the long-term aware attention (LA) mechanism, the first layer of the encoder RNN may be used as a key and a value, and the second layer of the encoder RNN may be used as a key. Both ends of a hidden representation of the second layer of the encoder RNN may be used to make query information. For example, this may be expressed by the following equation:

$$LA_i = \sum_{j=1}^{T_x} \alpha_{ij} h_j^1 \qquad \text{Equation 4}$$

$$\alpha_{ij} = \frac{\exp(e_{ij})}{\sum_{k=1}^{T_x} \exp(e_{ik})}$$

$$e_{ij} = f(s_{i-1}, h_j^1, h_j^2)$$

Referring to Equation 4, $LA_i$ may indicate an attention vector regarding the i-th step of decoding, $h_j^1$ may indicate a hidden representation of the first layer of the encoder RNN, and $h_j^2$ may indicate a hidden representation of the second layer of the encoder RNN.

Through the calculation as shown in Equation 4, the long-term aware attention (LA) mechanism may maintain short-term memory information for indicating a specific meaning of a word. The long-term aware attention (LA) mechanism may combine the short-term memory information by using additional sentence-level information in order to indicate a substantial meaning or role in the sentence.

The f function may be configured to be used to calculate a weight by a fully connected neural network. For example, the f function may be expressed by the following equation:

$$f(s_{i-1}, h_j^1, h_j^2) = \text{Softmax}(FC(\text{Tanh}(FC(s_{i-1})) + \text{Tanh}(FC(h_j^1)) + \text{Tanh}(FC(h_1^2)))) \quad \text{Equation 5}$$

In Equation 5, FC may indicate a fully connected neural network layer as a function or methodology.

The electronic device and the method according to various embodiments may configure an additional RNN to the decoder. The electronic device and the method may extract a slot or an intent through the additional decoder RNN, based on the obtained long-term aware attention (LA).

The electronic device and the method according to various embodiments may provide light-house positional encoding as new positional encoding used in the LA-RNN model. The light-house positional encoding may consider a relative distance between a current position and a comparison position. The light-house positional encoding may define one trained embedding, unlike position-wise encoding and fixed-encoding. The light-house positional encoding may not be positioned at starting representations of the encoder and the decoder, and may be positioned only inside attention calculation. For example, this may be expressed by the following equation:

$$p_i^b = \beta * |b-i| * D \quad \text{Equation 6}$$

Referring to Equation 6, i may indicate a sequential index of a word, b may indicate a current position index, and $D \in \mathbb{R}^d$ may indicate a distance embedding having a dimension d, and β may indicate a parameter for controlling a norm of encoding increasing according to a distance.

The light-house positional encoding may define one distance embedding, unlike fixed encoding such as a sinusoid type, or trained position-wise encoding set independently for respective positions. The light-house positional encoding may configure positional encoding $p_i^b$ regarding respective word positions i by multiplying the one distance embedding by the parameter β and an absolute distance from the current position b. Accordingly, the light-house positional encoding may have fewer position-related parameters than the position-wise encoding. In addition, the norm of the positional encoding may increase as the distance from the comparison position increases. Accordingly, with respect a deep layer, distance-related information may be effectively considered from positive and negative of a weight and encoding.

According to an embodiment, β may be a hyper-parameter related to an average length of a sentence. For example, β may be set to 1. According to another embodiment, β may be a learned parameter.

In the LA-RNN model according to various embodiments, the light-house positional encoding may not be inserted into starting representations of the encoder and the decoder, and may be inserted into the inside of a function (for example, a of Equation 2, f of Equation 5) for calculating the attention.

For example, the light-house positional encoding inserted into the function a for calculating the attention may be expressed by the following equation:

$$a(s_{i-1}, h_j^1, h_j^2) = f_4(f_1(s_{i-1}), f_2(h_j^1, p_j^i), f_3(h_j^2, p_j^i)) \quad \text{Equation 7}$$

Referring to Equation 7, a may be a function used to obtain the long-term aware attention in Equation 2. The light-house positional encoding $p_j^i$ may be used as a key for obtaining a weight $\alpha_{ij}$ to obtain the long-term aware attention. In various embodiments, the LA-RNN model may concatenate the light-house positional encoding $p_j^i$ into hidden representations (for example, $h_j^1$, $h_j^2$) configured from the plurality of layers (for example, 423, 433) included in the encoder RNN. For example, the LA-RNN model may configure new keys $f_2$, $f_3$ in which the light-house positional encoding $p_j^i$ is concatenated into the hidden representations (for example, $h_j^1$, $h_j^2$). The LA-RNN model may obtain the long-term aware attention by using the keys $f_2$, $f_3$ in which the light-house positional encoding $p_j^i$ is concatenated.

For example, the light-house positional encoding inserted into the function f for calculating the attention may be expressed by the following equation:

$$f(s_{i-1}, h_j^1, h_j^2) = \text{Softmax}(FC(\text{Tanh}(FC(s_{i-1})) + \text{Tanh}(FC([h_j^1, p_j^i])) + \text{Tanh}(FC([h_j^2, p_j^i])))) \quad \text{Equation 8}$$

In Equation 8, the operation [a, b] may indicate a concatenating vector of a and b. According to an embodiment, the LA-RNN model may use the positional encoding only when necessary, by inserting the light-house positional encoding into the attention calculation as described above.

n a system (for example, the system 390) related to the LA-RNN model according to various embodiments, a device for training the LA-RNN model may perform multi-task learning. The device for training the LA-RNN model may train the language model 310 or 410, the slot filling model 320 or 420, and the intent detection model 330 or 430, simultaneously (or in parallel, at a time). Hereinafter, this will be described with reference to FIG. 4.

In the multi-task learning action according to various embodiments, the device and the method for training the LA-RNN model may configure a cost for multi-task learning by multiplying a cost for the language model 410 by a weight-decay term.

For example, costs for the respective tasks of the three models 410, 420, 430 may not be equally applied. A term which is the cost for the language model 410 multiplied by the weight-decay term may be used as a regularizer. For example, the language model 410 may be used as a tool for helping in training the task models 420, 430 as a regularizer. For example, by multiplying the cost for the language model 410 by the weight-decay term, a limit may be put on training of the task models 420, 430. Accordingly, the slot filling model 420 and the intent detection model 430 may be trained based on the regularizer.

According to an embodiment, the device and the method for training the LA-RNN model may perform equivalent addition with respect to the cost for the slot filling model 420 and the cost for the intent detection model 430 in order to configure a cost for the multi-tasking learning. The device and the method for training the LA-RNN model may multiply the cost for the language model 410 by the weight-decay term in order to configure the cost for the multi-task learning. For example, the task of the language model 410 may be a sub-task rather than a main task, and may contribute to the training of the slot filling model 420 and the intent detection model 430. The weight-decay term may be, for example, a hyper parameter, and may be determined before the model is trained. For example, the weight-decay term may be determined by prior training.

In various embodiments, the three models (that is, the slot filling model, the intent detection model, the language model) and their costs may be stably trained through multi-task learning, and may rapidly converge.

According to various embodiments as described above, an electronic device (for example, the intelligent server 200) using an artificial neural network model (for example, the LA-RNN model, 320, 330, 420, 430) including an attention mechanism may include: a memory (for example, the memory 202) configured to store information including a plurality of recurrent neural network (RNN) layers (for example, 301, 302, 303, 421, 423, 431, 433); and at least one processor (for example, the processor 201) connected with the memory, and the at least one processor may be configured to: set, as a first key and a value, at least one first hidden representation (for example, $h_j^1$, $h_1^1$, $h_2^1$, $h_3^1$) obtained through at least one first layer (for example, 301) from among the plurality of RNN layers; set, as a second key, at least one second hidden representation (for example, $h_j^2$, $h_1^2$, $h_2^2$, $h_3^2$) obtained through at least one second layer (for example, 302) from among the plurality of RNN layers; and, based at least on data on the first key, data on the second key, or data on the value, obtain an attention (for example, $LA_i$, $LA_1$, $LA_2$, $LA_3$, $LA_{intent}$) included in the attention mechanism.

According to various embodiments, in the artificial neural network (for example, the LA-RNN model, 320, 330, 420, 430), the at least one first layer (for example, 301) may be positioned at a lower stage than the at least one second layer (for example, 302), and the at least one processor (for example, the processor 201) may be configured to obtain the at least one second hidden representation (for example, $h_j^2$, $h_1^2$, $h_2^2$, $h_3^2$) from the at least one first hidden representation (for example, $h_j^1$, $h_1^1$, $h_2^1$, $h_3^1$) through the at least one second layer (for example, 302).

For example, the at least one processor may be configured to obtain, from the attention, data on a slot or data on an intent, through at least one third layer positioned at a higher stage (for example, a decoder RNN) than the at least one second layer from among the plurality of RNN layers.

In various embodiments, the at least one processor (for example, the processor 201) may be configured to obtain data on a weight (for example, $\alpha_{ij}$) of each of the first key and the second key, based on the data on the first key (for example, $h_j^1$) and the data on the second key (for example, $h_j^2$), and to obtain the attention (for example, $LA_i$, $LA_{intent}$) based on a weighted sum of the data on the weight (for example, $\alpha_{ij}$) and the data on the value (for example, $h_j^1$).

In various embodiments, the at least one processor (for example, the processor 201) may be configured to obtain the attention (for example, $LA_i$) based on the following equation:

$$LA_i = \sum_{j=1}^{T_x} \alpha_{ij} h_j^1$$

$$\alpha_{ij} = \frac{\exp(e_{ij})}{\sum_{k=1}^{T_x} \exp(e_{ik})}$$

$$e_{ij} = a(s_{i-1}, h_j^1, h_j^2)$$

where i indicates a step of decoding, j indicate an index of an input regarding the RNN, $T_x$ indicates a length of an input sequence, $s_{i-1}$ indicates a decoder state at the i-th step of decoding, $LA_i$ indicates an attention regarding the i-th step of decoding, a indicates a neural network, $\alpha_{ij}$ indicates a weight regarding $s_{i-1}$, which is obtained by a, $h_j^1$ indicates the at least one first hidden presentation, and $h_j^2$ indicates the at least one second hidden representation.

For example, the at least one processor may be configured to: obtain data on a third key (for example, $f_2$) in which positional encoding (for example, $p_i^b$) is applied to the at least one first hidden representation; obtain data on a fourth key (for example, $f_3$) in which the positional encoding (for example, $p_i^b$) is applied to the at least one second hidden representation; and obtain the attention (for example, $LA_i$) based at least on the third key and the fourth key.

For example, the at least one processor may be configured to obtain a based on the following equation:

$$a(s_{i-1}, h_j^1, h_j^2) = f_4(f_1(s_{i-1}), f_2(h_j^1, p_j^i), f_3(h_j^2, p_j^i))$$

where $p_j^i$ indicates a positional encoding regarding the i-th input for the RNN at the i-th step of decoding, and $f_1$, $f_2$, $f_3$, and $f_4$ indicate functions or artificial neural networks.

In various embodiment, training a language model (for example, 310, 410) regarding the RNN, training a slot filling model (for example, 320, 420) regarding the RNN, and training an intent detection model (for example, 330, 430) regarding the RNN may share at least one of at least one layer (for example, 301, 302, 303) of the plurality of RNN layers, the at least one first hidden representation (for example, $h_j^1$), or the at least one second hidden representation (for example, $h_j^2$).

For example, a cost for the RNN may be obtained based at least on multiplication of data indicating a cost regarding the language model (for example, 310, 410) by a weight-decay term.

In various embodiments, at least one layer of the plurality of RNN layers may include a bi-directional RNN layer.

According to various embodiments as described above, a non-transitory computer-readable storage medium may store one or more programs for storing information including a plurality of recurrent neural network (RNN) layers (for example, 301, 302, 303, 421, 423, 431, 433), and for executing: setting, as a first key and a value, at least one first hidden representation (for example, $h_j^1$, $h_1^1$, $h_2^1$, $h_3^1$) obtained through at least one first layer (for example, 301) from among the plurality of RNN layers; settng, as a second key, at least one second hidden representation (for example, $h_j^2$, $h_1^2$, $h_2^2$, $h_3^2$) obtained through at least one second layer (for example, 302) from among the plurality of RNN layers; and, based at least on data on the first key, data on the second key, or data on the value, obtaining an attention (for example, $LA_i$, $LA_1$, $LA_2$, $LA_3$, $LA_{intent}$) included in an attention mechanism.

According to various embodiments, in the artificial neural network (for example, the LA-RNN model, 320, 330, 420, 430), the at least one first layer (for example, 301) may be positioned at a lower stage than the at least one second layer (for example, 302), and the non-transitory computer-readable storage medium may further store one or more programs for executing obtaining the at least one second hidden representation (for example, $h_j^2$, $h_1^2$, $h_2^2$, $h_3^2$) from the at least one first hidden representation (for example, $h_j^1$, $h_1^1$, $h_2^1$, $h_3^1$) through the at least one second layer (for example, 302).

For example, the non-transitory computer-readable storage medium may further store one or more programs for executing obtaining, from the attention, data on a slot or data on an intent, through at least one third layer positioned at a higher stage (for example, a decoder RNN) than the at least one second layer from among the plurality of RNN layers.

In various embodiments, the non-transitory computer-readable storage medium may further store one or more programs for executing obtaining data on a weight (for example, $\alpha_{ij}$) of each of the first key and the second key, based on the data on the first key (for example, $h_j^1$) and the data on the second key (for example, $h_j^2$), and obtaining the attention (for example, $LA_i$, $LA_{intent}$) based on a weighted sum of the data on the weight (for example, $\alpha_{ij}$) and the data on the value (for example, $h_j^1$).

In various embodiments, the non-transitory computer-readable storage medium may further store one or more programs for executing obtaining the attention (for example, $LA_i$) based on the following equation:

$$LA_i = \sum_{j=1}^{T_x} \alpha_{ij} h_j^1$$

$$\alpha_{ij} = \frac{\exp(e_{ij})}{\sum_{k=1}^{T_x} \exp(e_{ik})}$$

$$e_{ij} = a(s_{i-1}, h_j^1, h_j^2)$$

where i indicates a step of decoding, j indicate an index of an input regarding the RNN, $T_x$ indicates a length of an input sequence, $s_{i-1}$ indicates a decoder state at the i-th step of decoding, $LA_i$ indicates an attention regarding the i-th step of decoding, a indicates a neural network, $\alpha_{ij}$ indicates a weight regarding $s_{i-1}$, which is obtained by a, $h_j^1$ indicates the at least one first hidden presentation, and $h_j^2$ indicates the at least one second hidden representation.

For example, the non-transitory computer-readable storage medium may further store one or more programs for executing: obtaining data on a third key (for example, $f_2$) in which positional encoding (for example, $p_i^b$) is applied to the at least one first hidden representation; obtaining data on a fourth key (for example, $f_3$) in which the positional encoding (for example, $p_i^b$) is applied to the at least one second hidden representation; and obtaining the attention (for example, $LA_i$) based at least on the third key and the fourth key.

For example, the non-transitory computer-readable storage medium may further store one or more programs for executing obtaining a based on the following equation:

$$a(s_{i-1}, h_j^1, h_j^2) = f_4(f_1(s_{i-1}), f_2(h_j^1, p_j^i), f_3(h_j^2, p_j^i))$$

where $p_j^i$ indicates a positional encoding regarding the i-th input for the RNN at the i-th step of decoding, and $f_1$, $f_2$, $f_3$, and $f_4$ indicate functions or artificial neural networks.

In various embodiment, training a language model (for example, 310, 410) regarding the RNN, training a slot filling model (for example, 320, 420) regarding the RNN, and training an intent detection model (for example, 330, 430) regarding the RNN may share at least one of at least one layer (for example, 301, 302, 303) of the plurality of RNN layers, the at least one first hidden representation (for example, $h_j^1$), or the at least one second hidden representation (for example, $h_j^2$).

For example, a cost for the RNN may be obtained based at least on multiplication of data indicating a cost regarding the language model (for example, 310, 410) by a weight-decay term.

Through tables 2 to 6, performance enhancement of the LA-RNN model according to various embodiments will be described. However, this is merely an example and various embodiments are not limited to numerical characteristics described in tables 2 to 6.

Table 2 may show a dataset which was used to conduct an experiment on performance enhancement of the LA-RNN model according to various embodiments. Tables 3 to 6 may show performance enhancement of the LA-RNN model according to various embodiments.

The air travel information system (ATIS) corpus (Hemphill et al., 1990) may be a dataset which is generally used in researches on language understanding. For example, the dataset may be configured with sentences of persons who book their flights. Tables 3 to 6 may show results of the experiment using the ATIS corpus used in Hakkani-Tur et al. (2016). Tables 3 to 6 may show results of experiments on a dataset of 5 domains of Samsung Bixby and the ATIS dataset. Table 2 may show the dataset of the 5 domains of Samsung Bixby.

TABLE 2

| Domains | # of train | # of test | # of slot labels | # of intent types |
|---|---|---|---|---|
| Calculator | 3401 | 680 | 10 | 2 |
| Calendar | 9062 | 1812 | 70 | 24 |
| Camera | 9425 | 1885 | 63 | 61 |
| Gallery | 61885 | 12377 | 54 | 197 |
| Messages | 18571 | 3714 | 49 | 74 |

Referring to table 2, the number of training sets, the number of test sets, the number of slot labels, the number of intent types may be shown.

Table 3 may show that, regarding the ATIS, the slot filling performance (for example, F1-score) of the LA-RNN model is enhanced in comparison to those of the other models.

TABLE 3

| Model | Best F1 score |
|---|---|
| RNN with Label Sampling (Liu and Lane, 2015) | 94.89 |
| Hybrid RNN (Mesnil et al., 2015) | 95.06 |
| Deep LSTM (Yao et al., 2014) | 95.08 |
| RNN-EM (Peng et al., 2015) | 95.25 |
| bLSTM (Hakkani-Tur et al, 2016) | 95.48 |
| Encoder-labeler Deep LSTM (Kurata et al., 2016) | 95.66 |
| Attention Encoder-Decoder NN (Slot only) (Liu and Lane, 2016) | 95.78 |
| Attention BiRNN (Slot only) (Liu and Lane, 2016) | 95.75 |
| Attention Encoder-Decoder NN (Joint) (Liu and Lane, 2016) | 95.87 |
| Attention BiRNN (Joint) (Liu and Lane, 2016) | 95.98 |
| LA-RNN (Slot only) | 96.06 |
| LA-RNN (Joint) | 96.09 |

Table 4 may show that, regarding the ATIS, the intent detection performance of the LA-RNN model is enhanced (for example, an errate rate is reduced) in comparison to those of the other models.

TABLE 4

| Model | Best error rate |
|---|---|
| Word embeddings updated and bLSTM (Kim et al., 2015) | 2.69 |
| LSTM (Ravuri and Stolcke, 2015a) | 2.45 |
| Attention BiRNN (Joint) (Liu and Lane, 2016) | 1.79 |
| Attention Encoder-Decoder NN (Joint) (Liu and Lane, 2016) | 1.57 |
| LA-RNN (Joint) | 1.46 |

Referring to tables 3 and 4, regarding "joint" training and "slot only" training, the LA-RNN model may have enhanced performance in slot filling and intent detection, in comparison to the other models. In particular, regarding "joint" training, the RNN model may provide the best performance, 96.09 F1-score, in slot filling, and may provide the minimum error rate, 1.46, in intent detection. Accordingly, the action of training the slot filling model with intent information can enhance the performance of slot filling.

Table 5 may show that, regarding the 5 domains of Samsung Bixby, the performance of slot filling (for example, F1-score) of the LA-RNN model is enhanced in comparison to those of the other models.

TABLE 5

| Model | Gallery | Calculator | Calendar | Messages | Camera |
|---|---|---|---|---|---|
| Hybrid RNN (Mesnil et al., 2015) | 88.41 | 97.18 | 71.57 | 74.17 | 87.44 |
| Encoder-labeler Deep LSTM (Kurata et al., 2016) | 94.03 | 98.2 | 87.34 | 88.42 | 93.51 |
| Attention BiRNN (Slot only) (Liu and Lane, 2016) | 98.4 | 97.93 | 94.00 | 91.95 | 98.47 |
| Attention BiRNN (Joint) (Liu and Lane, 2016) | 97.28 | 97.98 | 92.71 | 91.11 | 98.38 |
| LA-RNN (Slot only) | 99.30 | 99.93 | 97.03 | 96.91 | 99.81 |
| LA-RNN (Joint) | 99.35 | 99.92 | 97.33 | 97.31 | 99.72 |

Referring to table 5, regarding slot filling, there may be a greater difference in performance between the LA-RNN model and the other models in the case of datasets of the 5 domains of Samsung Bixby than in the case of the ATIS dataset. In particular, in the case of datasets having high complexity, such as a calendar domain and a message domain, the LA-RNN model may have enhanced performance of about 5% or higher in comparison to the other models. In table 5, both the "slot only" training model and the "joint" training model may have higher F1-score than the other models. Since the "joint" training model of the LA-RNN generally have higher performance than the "slot only" training model, the joint training may have more advantageous effects.

Table 6 may show that, regarding the 5 domains of Samsung Bixby, the intent detection performance of the LA-RNN model is enhanced (for example, an error rate is reduced), in comparison to those of the other models.

TABLE 6

| Model | Gallery | Calculator | Calendar | Messages | Camera |
|---|---|---|---|---|---|
| Attention BiRNN (Joint) (Liu and Lane, 2016) | 1.35 | 0.00 | 3.20 | 2.53 | 0.53 |
| LA-RNN (Joint) | 1.32 | 0.00 | 2.76 | 1.46 | 0.53 |

Referring to table 6, regarding intent detection on the datasets of the 5 domains of Samsung Bixby, the LA-RNN model may have a smaller error rate than the other models. In the datasets having high complexity, such as the calendar domain and the message domain, the LA-RNN model may have a more reduced error rate. Tables 2 to 6 do not intend to limit various embodiments.

Figure 5:
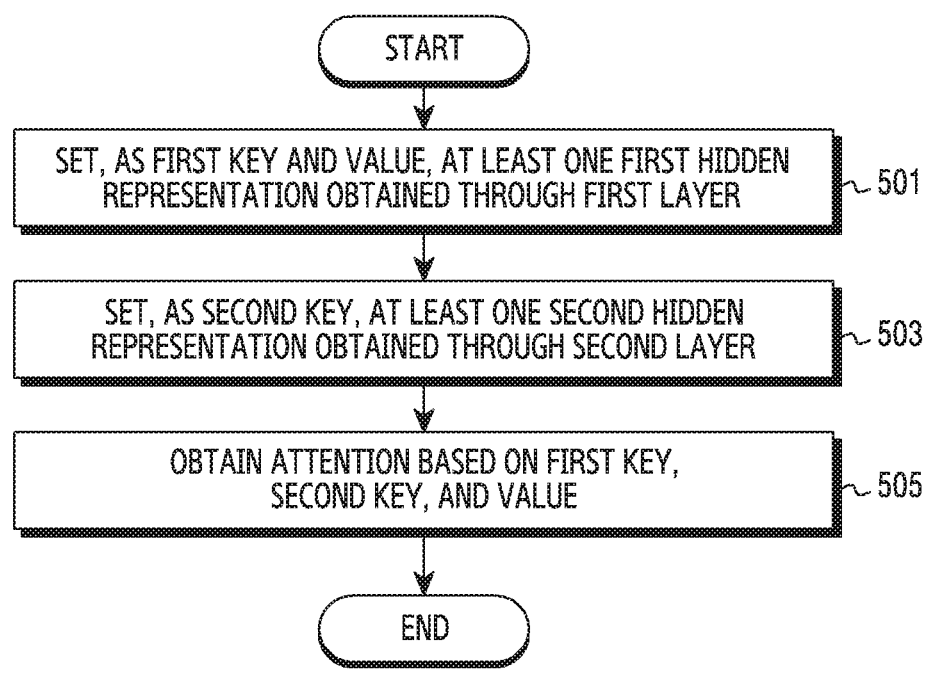
FIG. 5 is a view illustrating an example of an operation of an electronic device according to various embodiments.

FIG. 5 illustrates an example of an operation of an electronic device according to various embodiments. Operations of FIG. 5 may be performed by a device for training an LA-RNN model or a device (for example, the intelligent server 200 or the NLU module 220) having the trained LA-RNN model implemented therein. Hereinafter, the electronic device may indicate the device for training the LA-RNN model or the device having the trained LA-RNN model implemented therein. The electronic device may store an RNN (or information regarding the RNN) including a plurality of layers in a memory.

Referring to FIG. 5, in operation 501, the electronic device may set, as a first key and a value, at least one first hidden representation obtained through at least one first layer of the plurality of layers.

For example, the RNN stored in the memory of the electronic device may include an encoder portion and a decoder portion. The encoder RNN may configure (or obtain) hidden representations to be used in the decoder RNN, from a sequence indicating an input (for example, a character-based sentence, a word-based sentence, etc.). The electronic device may obtain the first hidden representation from the input sequence by using the at least one first layer in the encoder RNN. The electronic device may use the first hidden representation as the first key and the value for obtaining an attention in the decoder RNN.

In operation 503, the electronic device may set, as a second key, at least one second hidden representation obtained through at least one second layer of the plurality of layers. The electronic device may obtain the second hidden representation by using the at least one second layer in the encoder RNN. For example, the electronic device may obtain the second hidden representation from the first hidden representation by using the at least one second layer in the encoder RNN. Accordingly, the second layer may be positioned at a higher stage than the first layer. The electronic device may use the second hidden representation as the second key for obtaining an attention in the decoder RNN. The electronic device may not use the second hidden representation as a value in the decoder RNN.

The at least one first layer may be related to information regarding a short-term memory. The at least one second layer may be related to information regarding a long-term memory. For example, in the input sequence of the RNN, a portion of the input sequence contributing to the second hidden representation may be wider than a portion of the input sequence contributing to the first hidden representation.

In operation 505, the electronic device may obtain an attention based on the first key, the second key, and the value in the decoder RNN. For example, the electronic device may obtain information on a slot or information on an intent from the attention by using an additional layer in the decoder RNN.

According to various embodiments as described above, in an operation method of an electronic device (for example, the intelligent server 200) using an artificial neural network model including an attention mechanism, the electronic device may store information including a plurality of recurrent neural network (RNN) layers (for example, 301, 302, 303, 421, 423, 431, 433), and the method may include: setting, as a first key and a value, at least one first hidden representation (for example, $h_j^1$, $h_1^1$, $h_2^1$, $h_3^1$) obtained through at least one first layer (for example, 301) from among the plurality of RNN layers; setting, as a second key, at least one second hidden representation (for example, $h_j^2$, $h_1^2$, $h_2^2$, $h_3^2$) obtained through at least one second layer (for example, 302) from among the plurality of RNN layers; and, based at least on data on the first key, data on the second key, or data on the value, obtaining an attention (for example, LAi, LA1, LA2, LA3, LAintent) included in the attention mechanism.

Figure 6:
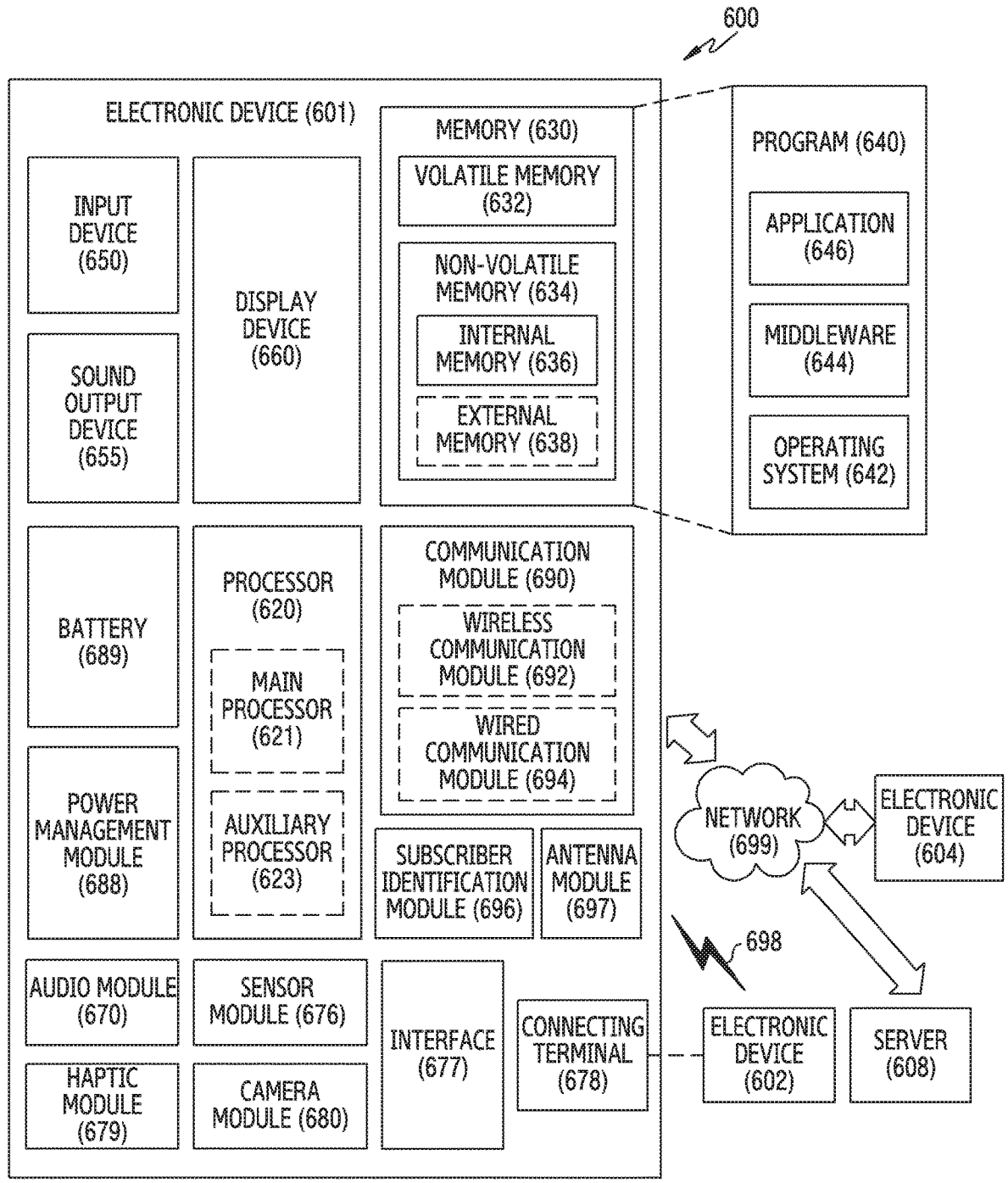
FIG. 6 is a block diagram of an electronic device in a network environment according to various embodiments.

FIG. 6 is a block diagram illustrating an electronic device 601 in a network environment 600 according to various embodiments. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). According to an embodiment, the electronic device 601 may communicate with the electronic device 604 via the server 608.

For example, the server 608 may include the intelligent server 200 of FIG. 2, the personalization information server 300, the suggestion server 400. The server 608 (for example, the intelligent server 200) may communicate with other servers (for example, the personalization information server 300, the suggestion server 400). In another example, the electronic device 601 may correspond to the server (for example, the intelligent server 200, the personalization information server 300, the suggestion server 400). When the electronic device 601 corresponds to the intelligent server 200, the processor 620 may correspond to the processor 201, and the memory 630 may correspond to the memory 202.

According to an embodiment, the electronic device 601 may include a processor 620, memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In some embodiments, at least one (e.g., the display device 660 or the camera module 680) of the components may be omitted from the electronic device 601, or one or more other components may be added in the electronic device 601. In some embodiments, some of the components may be implemented as single integrated circuitry. For example, the sensor module 676 (e.g., a fingerprint sensor, an iris sensor, or an illuminance sensor) may be implemented as embedded in the display device 660 (e.g., a display).

The processor 620 may execute, for example, software (e.g., a program 640) to control at least one other component (e.g., a hardware or software component) of the electronic device 601 coupled with the processor 620, and may perform various data processing or computation. According to one embodiment, as at least part of the data processing or computation, the processor 620 may load a command or data received from another component (e.g., the sensor module 676 or the communication module 690) in volatile memory 632, process the command or the data stored in the volatile memory 632, and store resulting data in non-volatile memory 634. According to an embodiment, the processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or to be specific to a specified function. The auxiliary processor 623 may be implemented as separate from, or as part of the main processor 621.

The auxiliary processor 623 may control at least some of functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to an embodiment, the auxiliary processor 623 (e.g., an image signal processor or a communication processor) may be implemented as part of another component (e.g., the camera module 680 or the communication module 690) functionally related to the auxiliary processor 623. The memory 630 may store various data used by at least one component (e.g., the processor 620 or the sensor module 676) of the electronic device 601. The various data may include, for example, software (e.g., the program 640) and input data or output data for a command related thererto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to an embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to an embodiment, the audio module 670 may obtain the sound via the input device 650, or output the sound via the sound output device 655 or a headphone of an external electronic device (e.g., an electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 602) directly (e.g., wiredly) or wirelessly. According to an embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device (e.g., the electronic device 602). According to an embodiment, the connecting terminal 678 may include, for example, a HDMI connector, a USB connector, a SD card connector, or an audio connector (e.g., a headphone connector), The haptic module 679 may convert an electrical signal into a mechanical stimulus (e.g., a vibration or a movement) or electrical stimulus which may be recognized by a user via his tactile sensation or kinesthetic sensation. According to an embodiment, the haptic module 679 may include, for example, a motor, a piezoelectric element, or an electric stimulator.

The camera module 680 may capture a still image or moving images. According to an embodiment, the camera module 680 may include one or more lenses, image sensors, image signal processors, or flashes.

The power management module 688 may manage power supplied to the electronic device 601. According to one embodiment, the power management module 688 may be implemented as at least part of, for example, a power management integrated circuit (PMIC).

The battery 689 may supply power to at least one component of the electronic device 601. According to an embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor (AP)) and supports a direct (e.g., wired) communication or a wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or infrared data association (IrDA)) or the second network 699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to an embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. According to an embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

While specific embodiments have been described in the detailed descriptions of the disclosure, it will be understood by those skilled in the art that various changes in form and details may be made therein without departing from the spirit and scope of the disclosure as defined by the appended claims. Therefore, the scope of the disclosure is defined not by the described embodiments but by the appended claims, and all differences within the scope will be construed as being included in the disclosure.

The following documents are integrated into the present document and applied thereto.

(1) Ankur Bapna, Gokhan Tur, Dilek Hakkani-Tur, and Larry Heck. 2017. Towards Zero-Shot Frame Semantic Parsing for Domain Scaling. in Proc. Interspeech.

(2) Ashish Vaswani, Noam Shazeer, Niki Parmar, Jakob Uszkoreit, Llion Jones, Aidan N. Gomez, Lukasz Kaiser, and Illia Polosukhin. 2017. Attention Is All You Need. arXiv preprint arXiv:1706.03762.

(3) Baolin Peng, Kaisheng Yao, Li Jing, and Kam-Fai Wong. 2015. Recurrent Neural Networks with External Memory for Spoken Language Understanding. Natural Language Processing and Chinese Computing, pp. 25-35, Springer.

(4) Bing Liu and Ian Lane. 2015. Recurrent Neural Network Structured Output Prediction for Spoken Language Understanding. in Proc. NIPS.

(5) Bing Liu and Ian Lane. 2016. Attention-Based Recurrent Neural Network Models for Joint Intent Detection and Slot Filling. in Proc. Interspeech.

(6) Charles T. Hemphill, John J. Godfrey, and George R. Doddington.1990. The ATIS Spoken Language Systems Pilot Corpus. in Proc. DARPA Speech and natural language workshop.

(7) Dilek Hakkani-Tur, Gokhan Tur, Ashi Celikyilmaz, Yun-Nung Chen, Jianfeng Gao, Li Deng, and Ye-Yi Wang. 2016. Multi-Domain Joint Semantic Frame Parsing using Bi-directional RNN-LSTM. in Proc. Interspeech.

(8) Dzmitry Bahdanau, Kyunghyun Cho, and Yoshua Bengio. 2015. Neural Machine Translation by jointly learning to align and translate. in ICLR.

(9) Felix A. Gers and Jurgen Schmidhuber. 2000. Recurrent Nets that Time and Count. In Neural Networks. in Proc. IJCNN.

(10) Gábor Melis, Chris Dyer, and Phil Blunsom. 2017. On the state of the art of evaluation in neural language models. arXiv preprint arXiv:1707.05589.

(11) Gakuto Kurata, Bing Xiang, Bowen Zhou, and Mo Yu. 2016. Leveraging Sentence-level Information with Encoder LSTM for Natural Language Understanding. arXiv preprint arXiv:1601.01530.

(12) Grégoire Mesnil, Yann Dauphin, Kaisheng Yao, Yoshua Bengio, Li Deng, Dilek Hakkani-Tur, Xiaodong He, Larry Heck, Gokhan Tur, Dong Yu, and Geoffrey Zweig. 2015. Using Recurrent Neural Networks for Slot Filling in Spoken Language Understanding. in Proc. IEEE/ACM.

(13) Jacob Andreas and Dan Klein. 2014. When and why are log-linear models self-normalizing? in Proc. NAACL.

(14) Jason P C Chiu and Eric Nichols. 2015. Named Entity Recognition with Bidirectional LSTM-CNNs. arXiv preprint arXiv:1511.08308.

(15) Jonas Gehring, Michael Auli, David Grangier, and Yann N. Dauphin. 2016. A Convolutional Encoder Model for Neural Machine Translation. arXiv preprint arXiv:1611.02344.

(16) Jonas Gehring, Michael Auli, David Grangier, Denis Yarats, and Yann N. Dauphin. 2017. Convolutional Sequence to Sequence Learning. arXiv preprint arXiv:1705.03122.

(17) Joo-Kyung Kim, Gokhan Tur, Asli Celikyilmaz, Bin Cao, and Ye-Yi Wang. 2016. Intent detection using semantically enriched word embeddings. in Proc. IEEE SLT.

(18) Junyoung Chung, Caglar Gulcehre, KyungHyun Cho, and Yoshua Bengio. 2014. Empirical Evaluation of Gated Recurrent Neural Networks on Sequence Modeling. in Proc. NIPS.

(19) Kaisheng Yao, Baolin Peng, Yu Zhang, Dong Yu, Geoffrey Zweig, and Yangyang Shi. 2014. Spoken Language Understanding using Long Short-Term Memory Neural Networks. in Proc. IEEE SLT.

(20) Lyan Verwimp, Joris Pelemans, Hugo Van hamme, and Patrick Wambacq. 2017. Character-Word LSTM Language Models. in Proc. EACL.

(21) Matthew D. Zeiler. 2012. ADADELTA: An adaptive learning rate method. arXiv preprint arXiv:1212.5701.

(22) Nitish Srivastava, Geoffrey Hinton, Alex Krizhevsky, Ilya Sutskever, and Ruslan Salakhutdinov. 2014. Dropout: A Simple Way to Prevent Neural Networks from Overfitting. JMLR, 15:1929-1958.

(23) Orhan Firat, Kyunghyun Cho, and Yoshua Bengio. 2016. Multi-Way, Multilingual Neural Machine Translation with a Shared Attention Mechanism. in Proc. NAACL.

(24) Sergey Ioffe and Christian Szegedy. 2015. Batch Normalization: Accelerating Deep Network Training by Reducing Internal Covariate Shift. in Proc. ICML.

(25) Stephen Merity, Nitish Shirish Keskar, and Richard Socher. 2017. Regularizing and Optimizing LSTM Language Models. arXiv preprint arXiv:1708.02182.

(26) Suman Ravuri and Andreas Stolcke. 2015a. A comparative study of neural network models for lexical intent classification. in Proc. IEEE ASRU.

(27) Suman Ravuri and Andreas Stolcke. 2015b. Recurrent Neural Network and LSTM Models for Lexical Utterance Classification. in Proc. Interspeech.

(28) Volodymyr Mnih, Nicolas Heess, Alex Graves, and Koray Kavukcuoglu. 2014. Recurrent Models of Visual Attention. in Proc. NIPS.

(29) Yangyang Shi, Kaisheng Yao, Hu Chen, Yi-Cheng Pan, Mei-Yuh Hwang, and Baolin Peng. 2015. Contextual spoken language understanding using recurrent neural networks. in Proc. ICASSP.

(30) Yarin Gal and Zoubin Ghahramani. 2016. A Theoretically Grounded Application of Dropout in Recurrent Neural Networks. in Proc. NIPS.

(31) Yoon Kim, Yacine Jernite, David Sontag, and Alexander M. Rush. 2016. Character-Aware Neural Language Models. in Proc. AAAI.

(32) Zhiheng Huang, Wei Xu, and Kai Yu. 2015. Bidirectional LSTM-CRF Models for Sequence Tagging. arXiv preprint arXiv:1508.01991.

The invention claimed is:

1. An electronic device using an artificial neural network model comprising an attention mechanism, the electronic device comprising:
 a memory configured to store information comprising a plurality of recurrent neural network (RNN) layers; and
 at least one processor connected with the memory,
 wherein the at least one processor is configured to:
  obtain first hidden representations through at least one first layer from among the plurality of RNN layers,
  set the first hidden representations as a first key and a value,
  obtain second hidden representations through at least one second layer from among the plurality of RNN layers,
  set the second hidden representations as a second key, wherein the at least one second layer is positioned at an upper stage than the at least one first layer in the artificial neural network and the first hidden representations are used as an input of the at least one second layer, and
  based on data on the first key, data on the second key, and data on the value, obtain an attention included in the attention mechanism, and
 wherein a cost for the RNN is obtained based on multiplication of data indicating a cost regarding a language model regarding the RNN by a weight-decay term, in training at least one of the language model, a slot filling model regarding the RNN, or an intent detection model regarding the RNN.

2. The electronic device of claim 1,
wherein the at least one processor is configured to obtain the second hidden representations from the first hidden representations through the at least one second layer.

3. The electronic device of claim 2, wherein the at least one processor is configured to obtain, from the attention, data on a slot or data on an intent, through at least one third layer positioned at a higher stage than the at least one second layer from among the plurality of RNN layers.

4. The electronic device of claim 1, wherein the at least one processor is configured to obtain data on a weight of each of the first key and the second key, based on the data on the first key and the data on the second key, and to obtain the attention based on a weighted sum of the data on the weight and the data on the value.

5. The electronic device of claim 1, wherein the at least one processor is configured to obtain the attention based on the following equation:

$$LA_i = \sum_{j=1}^{T_x} \alpha_{ij} h_j^1$$

$$\alpha_{ij} = \frac{\exp(e_{ij})}{\sum_{k=1}^{T_x} \exp(e_{ik})}$$

$$e_{ij} = a(s_{i-1}, h_j^1, h_j^2)$$

where i indicates a step of decoding, j indicates an index of an input regarding the RNN, $T_x$ indicates a length of an input sequence, $s_{i-1}$ indicates a decoder state at an i-th step of decoding, $LA_i$ indicates an attention regarding the i-th step of decoding, a indicates a neural network, $\alpha_{ij}$ indicates a weight regarding $s_{i-1}$, which is obtained by a, $h_j^1$ indicates one of the first hidden representations, and $h_j^2$ indicates one of the second hidden representations.

6. The electronic device of claim 5, wherein the at least one processor is configured to:
obtain data on a third key in which positional encoding is applied to the first hidden representations;
obtain data on a fourth key in which the positional encoding is applied to the second hidden representations; and
obtain the attention based at least on the third key and the fourth key.

7. The electronic device of claim 1, wherein training the language model regarding the RNN, training the slot filling model regarding the RNN, and training the intent detection model regarding the RNN share at least one of at least one layer of the plurality of RNN layers, the first hidden representations, or the second hidden representations.

8. A non-transitory computer-readable storage medium, which stores one or more programs for storing information comprising a plurality of recurrent neural network (RNN) layers, and for executing:
obtaining first hidden representations through at least one first layer from among the plurality of RNN layers;
setting the first hidden representations as a first key and a value; obtaining second hidden representations through at least one second layer from among the plurality of RNN layers;
setting the second hidden representations as a second key; and,
based on data on the first key, data on the second key, and data on the value, obtaining an attention included in an attention mechanism,
wherein the at least one second layer is positioned at an upper stage than the at least one first layer in an artificial neural network and the first hidden representations are used as an input of the at least one second layer,
and
wherein a cost for the RNN is obtained based on multiplication of data indicating a cost regarding a language model regarding the RNN by a weight-decay term, in training at least one of the language model, a slot filling model regarding the RNN, or an intent detection model regarding the RNN.

9. The non-transitory computer-readable storage medium of claim 8,
wherein the non-transitory computer-readable storage medium further stores one or more programs for executing obtaining the second hidden representations from the first hidden representations through the at least one second layer.

10. The non-transitory computer-readable storage medium of claim 9, further storing one or more programs for executing obtaining, from the attention, data on a slot or data on an intent, through at least one third layer positioned at a higher stage than the at least one second layer from among the plurality of RNN layers.

11. The non-transitory computer-readable storage medium of claim 8, further storing one or more programs for executing obtaining data on a weight of each of the first key and the second key, based on the data on the first key and the data on the second key, and obtaining the attention based on a weighted sum of the data on the weight and the data on the value.

12. The non-transitory computer-readable storage medium of claim 8, further storing one or more programs for executing obtaining the attention based on the following equation:

$$LA_i = \sum_{j=1}^{T_x} \alpha_{ij} h_j^1$$

$$\alpha_{ij} = \frac{\exp(e_{ij})}{\sum_{k=1}^{T_x} \exp(e_{ik})}$$

$$e_{ij} = a(s_{i-1}, h_j^1, h_j^2)$$

where i indicates a step of decoding, j indicates an index of an input regarding the RNN, $T_x$ indicates a length of an input sequence, $s_{i-1}$ indicates a decoder state at an i-th step of decoding, $LA_i$ indicates an attention regarding the i-th step of decoding, a indicates a neural network, $\alpha_{ij}$ indicates a weight regarding $s_{i-1}$, which is obtained by a, $h_j^1$ indicates one of the first hidden representations, and $h_j^2$ indicates one of the second hidden representations.

13. The non-transitory computer-readable storage medium of claim 12, further storing one or more programs for executing:
obtaining data on a third key in which positional encoding is applied to the first hidden representations;
obtaining data on a fourth key in which the positional encoding is applied to the second hidden representations; and
obtaining obtain the attention based at least on the third key and the fourth key.

14. The non-transitory computer-readable storage medium of claim 8, wherein training the language model regarding the RNN, training the slot filling model regarding the RNN, and training the intent detection model regarding the RNN share at least one of at least one layer of the plurality of RNN layers, the first hidden representations, or the second hidden representations.

15. An operation method of an electronic device using an artificial neural network model comprising an attention mechanism, the electronic device storing information comprising a plurality of recurrent neural network (RNN) layers, the method comprising:

obtaining first hidden representations through at least one first layer from among the plurality of RNN layers;

setting the first hidden representations as a first key and a value;

obtaining second hidden representations through at least one second layer from among the plurality of RNN layers;

setting the second hidden representations as a second key; and based on data on the first key, data on the second key, and data on the value, obtaining an attention included in the attention mechanism, wherein the at least one second layer is positioned at an upper stage than the at least one first layer in the artificial neural network and the first hidden representations are used as an input of the at least one second layer, and wherein a cost for the RNN is obtained based on multiplication of data indicating a cost regarding a language model regarding the RNN by a weight-decay term, in training at least one of the language model, a slot filling model regarding the RNN, or an intent detection model regarding the RNN.

* * * * *